(12) United States Patent
Ren

(10) Patent No.: US 8,179,090 B2
(45) Date of Patent: May 15, 2012

(54) ENERGY CONSUMING BODY AND A METHOD FOR SUPPLYING DYNAMIC FORCE ENERGY TO THE ENERGY CONSUMING BODY

(75) Inventor: Wen Lin Ren, Wuhan (CN)

(73) Assignee: Wuhan Runlin Science and Technology Development Co., Ltd., Hubei Province (CN)

( * ) Notice: Subject to any disclaimer, the term of this patent is extended or adjusted under 35 U.S.C. 154(b) by 771 days.

(21) Appl. No.: 12/171,429

(22) Filed: Jul. 11, 2008

(65) Prior Publication Data

US 2008/0272734 A1 Nov. 6, 2008

Related U.S. Application Data

(63) Continuation-in-part of application No. 10/514,466, filed on Nov. 10, 2004.

(30) Foreign Application Priority Data

| Jul. 28, 2002 | (CN) | 2002 1 0026699 |
| Jul. 30, 2002 | (CN) | 2002 2 0078550 U |
| Aug. 30, 2002 | (CN) | 2002 2 0078978 U |
| Apr. 9, 2003 | (CN) | 2003 1 0016364 |

(51) Int. Cl.
*H02J 7/00* (2006.01)
*F16K 15/20* (2006.01)
*B60C 7/00* (2006.01)

(52) U.S. Cl. .......... 320/109; 137/223; 152/311
(58) Field of Classification Search ............ 320/109
See application file for complete search history.

(56) References Cited

U.S. PATENT DOCUMENTS

| 4,027,712 | A | * | 6/1977 | Verdier | 152/311 |
| 4,534,438 | A | * | 8/1985 | Mowat et al. | 180/209 |
| 4,538,695 | A | * | 9/1985 | Bradt | 180/19.2 |
| 5,007,448 | A | * | 4/1991 | Olinger | 137/223 |
| 6,588,996 | B1 | * | 7/2003 | Collins | 410/9 |

* cited by examiner

Primary Examiner — M'Baye Diao

(57) ABSTRACT

The present invention discloses a type of secure and efficient wheel assembly using fluid or solid stuffing materials so as to minimize the blowout risks, a wheel rim transmission assembly, an energy exchanging arrangement used in transporting system, and a vehicle energy storage system, as well as corresponding methods for manufacturing and preparing such assemblies and arrangements in applications.

11 Claims, 17 Drawing Sheets

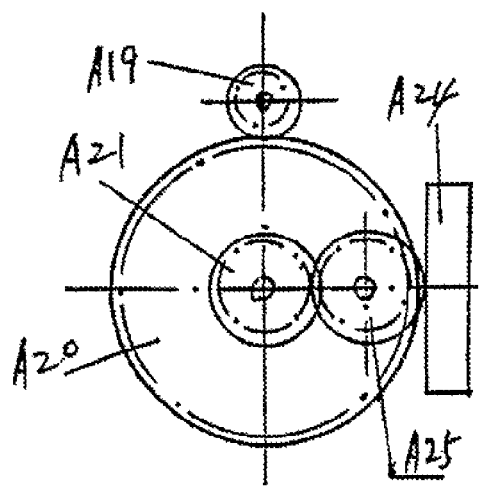
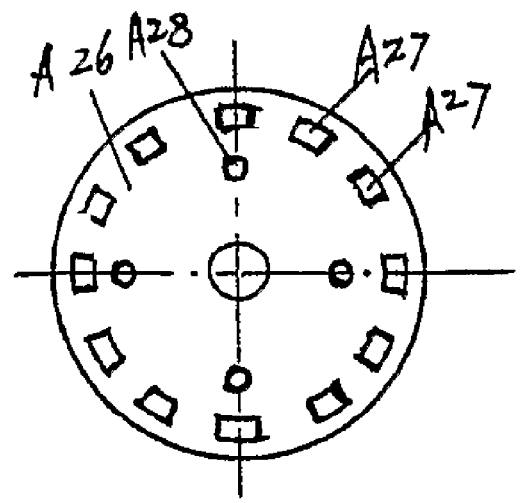
FIG.43               FIG.44
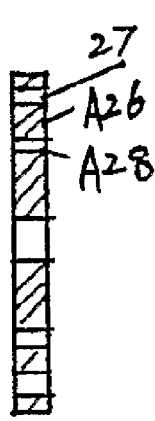 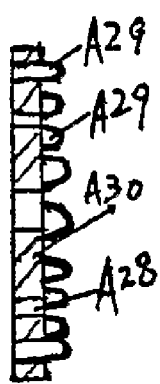 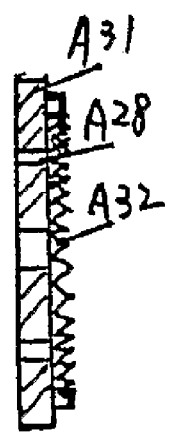 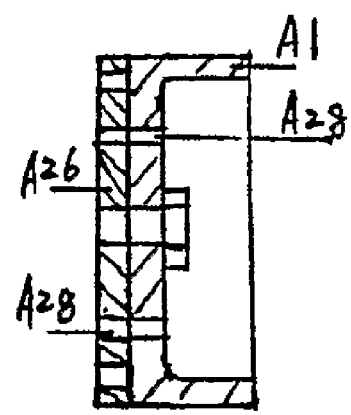
FIG.45     FIG.46     FIG.47     FIG.48

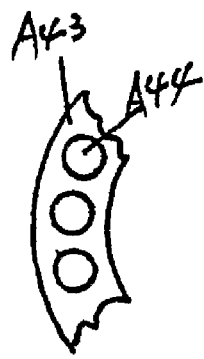  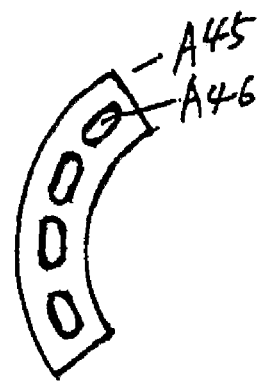
FIG.55　　　　　　　　FIG.56　　　　　　　　FIG.57
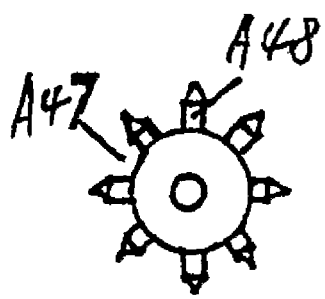 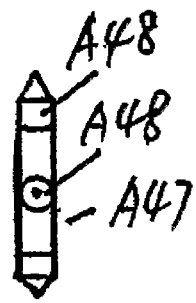
FIG.58　　　　　　　　FIG.59
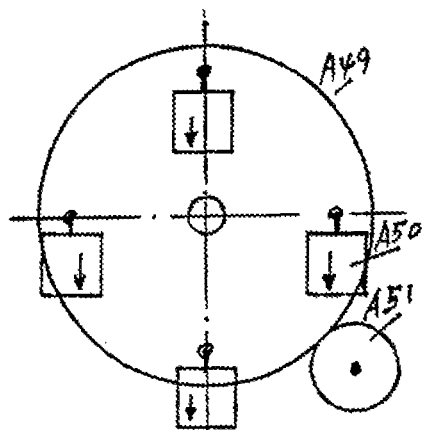 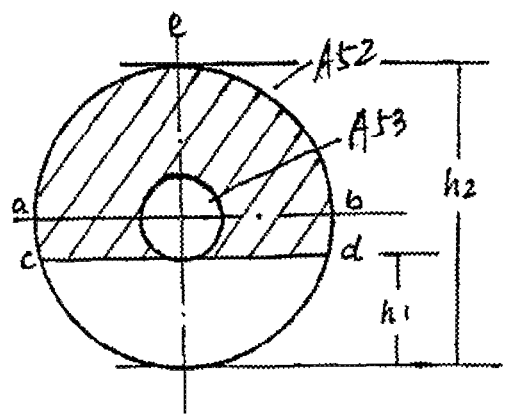
FIG.60　　　　　　　　FIG.61

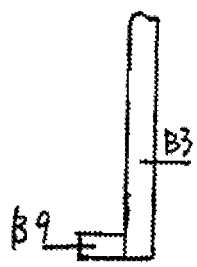
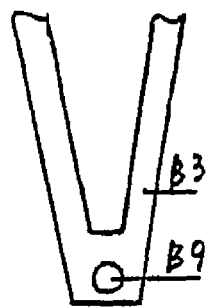
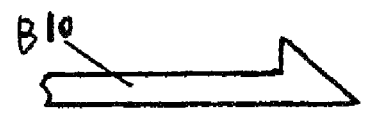
FIG.74  FIG.75  FIG.76
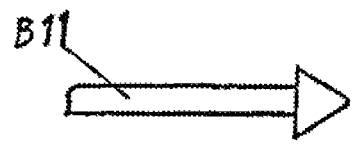
FIG.77  FIG.78  FIG.79
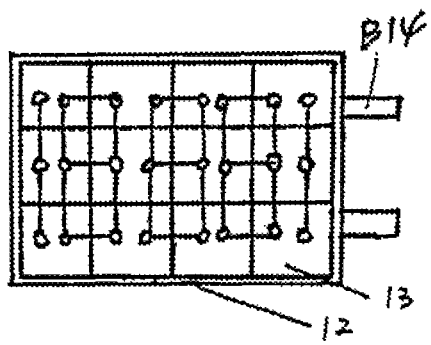
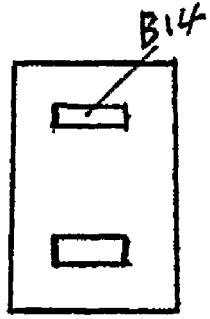
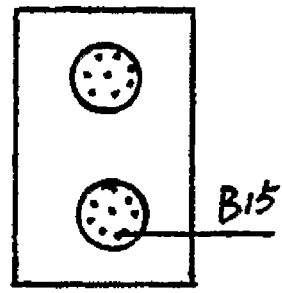
FIG.80  FIG.81  FIG.82

ENERGY CONSUMING BODY AND A METHOD FOR SUPPLYING DYNAMIC FORCE ENERGY TO THE ENERGY CONSUMING BODY

BACKGROUND OF THE PRESENT INVENTION

1. Field of Invention

The present invention relates to transporting system, more particularly, relates to a type of secure and efficient wheel assembly, a wheel rim transmission assembly, an energy exchanging arrangement used in transporting system, and a vehicle energy storage system, as well as corresponding methods for manufacturing and preparing such assemblies and arrangements in applications.

2. Description of Related Arts

Commonly, there are several drawbacks of wheels available in the market:

1. Poor security: the tires mounted to the wheel rim are subject to blowout accidents which cost and jeopardize human lives.

2. Inefficiency: as its name implied, efficiency refers to the working output of such wheel during a fixed period of time. For most pneumatic tires mounted to the wheel rim, the turning radius of such wheel is shortened in landing portion under a loaded pressure, however, the turning radius of remaining wheel portion are not shortened, instead, would been prolonged due to the increased pressure. As a result, the rotational wheel will have to overcome resistance force thus causing significant energy loss.

3. The wheel assembly is made of inferior materials, such as the air-tightness of the inner tube of the tire is not satisfied in most cases.

4. The structure of such wheel is not well designed, for example, the inner cavity and curvature of outer cover of the tire are not desired to prevent the turning radius of the wheel from being varied from time to time. And two side wall of outer cover of the tires are too high causing unnecessary raw material wasting.

5. Expensive costs: the landing circumferential surface of the tire outer cover is worn off easily, while two side walls of the outer cover are still of good shape, so the disposal of such tire is not an economic way.

6. Inconvenience: the tire inner tube should be refilled from time to time.

There are a plurality of drawbacks related to prior art transmission systems. For example, the vehicle wheels of a conventional transmission system (e.g., vehicle) are not well designed in a manner that achieves power savings. Commonly, the driving force generated from the transmission system is transmitted to the center of a wheel, i.e., on the axial shaft of the wheel. However, the resistance occurring at the circumferential edge of the wheel, i.e., the landing portion of the wheel, will slow the driving force. Thus, according to "wheel-axis theory" and "movable pulley theory," the design of vehicle wheels of a conventional transmission is not appropriate because the vehicle wheels of the transmission system are good for power-saving.

Furthermore, other conventional wheel transmission methods, such as rotational fans, propellers of vessels and airplanes, and blade wheels of fluid pumps, are also associated with inefficiencies in power savings. Inefficiencies in power savings include, for example, a new motorcycle in which the driving force generated from the motorcycle is transmitted to exert on the peripheral edge of the front wheel of the motorcycle. However, in reality, the driving force is not precisely transmitted to the peripheral edge of the front wheel, and thus, high power consumption and energy waste result, so as to damage the tires and their mechanical parts, and ultimately reducing the life span of the motorcycle. Also, such design will result in loss of friction of the tires when the tires are on water and mud. In addition, if the tire is not fully pumped up, the tire will soften, so as to shorten its radius, and thus, this will cause the transmission effect of the motorcycle to deteriorate.

In the traditional locomotives, the dynamic force is transferred by the connection rod which is coupled to the spokes of wheel, for driving the wheel into rotation. Since the locomotives had been collected in the museum, such transmission method had been abandoned. Those wheel chairs for those disabled people, an actuating wheel having proximate diameter with the driving wheel are provided at opposite side of the vehicle body for facilitating the vehicle operation. However, there are no such wheels applied in the motored vehicles. For those transmission utilizing electrical means, there existed some problems to be solved, such as high energy consumption, poor endurance.

The present invention refers to the energy supplying means, more particularly, relates to a method and apparatus for supplying energy to an electrical vehicle.

As its name implies, energy supplying refers to obtaining energy or power, including electricity, hydrogen, fuel gas, fuel oil, compressed air, etc. As a result, the charging and fueling process belong to energy supplying system. The public transportation and mobile communication are dependent on such energy supplying system to obtain necessary fuel, gas, electrical energy. However, conventional energy supplying system comprises a plurality of drawbacks; first of all, the recharging and the refueling process are not safe. Second, the charging process is time consuming. Third, the cruising continuality of vehicles is limited, for example, the electrical vehicle can cruise no more than 100 miles after fully charged. Fourth, the dynamic force is not sufficient. After a continuous operation, the electrical energy stored within the electrical vehicle will be weakened thus limiting the speed of such vehicle. Fifth, the energy sources are not universally applicable in different applications. Sixth, the conventional storage battery comprises a plurality separate battery units which are not convenient and user friendly.

SUMMARY OF THE PRESENT INVENTION

Accordingly, in order to overcome above mentioned drawbacks, the present invention provides a wheel assembly.

1. a primary object of the present invention is to alter the stuffing materials of a wheel. According to the present invention, the stuffing materials are selected from a group consisting of fluid, solid, cream, semifluid, soft, or composition or compound of the above mentioned materials, or otherwise, mixture of above mentioned materials with water, or hydrated substances with above materials. Alternatively, the stuffing materials are made of oil or oil compounds. It is noted that the stuffing materials could be filled by compressed pressure until the stuffing materials occupy at least one third of the wheel volume, or fully filled in the internal cavity with the wheel, to achieve the desirable pressure.

The cream formed stuffing materials could be injected into the tire during the tire assembly process. Afterwards, the stuffing materials will be squeezed and pressurized by clamping board so as to bear a load. Therefore, such kind of tire could be formed as a solidly stuffed body, as well as the foamed inter tube of such kind of tire, so there is no gas inlet existed on the tire. Furthermore, the solid stuffing material could be used as the inner support which will be specified in the present invention.

The solid granular articles could be aggregated and sealed within the tire as the stuffing materials. The aggregating process could be embodied as bonding of liquefied substance so as to form colloid stuffing material within the wheel. It is noted that elastic solid substance could be used stuffing materials as well, such as foam, foamed materials, foamed rubber, and soft materials. The foamed stuffing materials are utilized as inner tube of conventional tire, and could be integrated with the outer cover via a binding interface. The stuffing materials, for instance, the liquid stuffing materials could comprises various additives, such as leak-proof fluid, tire-repairing fluid.

Generally, tires of different purposes have different stuffing materials. The stuffing materials according to the present invention have a number of apparent advantages, first of all, the water-tightness property of rubber and plastic are much better than the air-tightness. And the cumbersome and laborious air-refilling process could be eliminated, at the same time, the turning radius of the landing portion are kept unchangeable, so that the turning resistance will be reduced as well.

Second, such stuffing materials are preventative to tire blowout.

Third, even the tire was blowout, such fluid, cream and solid stuffing materials would not be exploded out like air nor cause a flat tire as well as a serious consequence. In addition, even a tire blowout accident happened, the car equipped with such wheel would still run in a normal shape.

Fourth, since the fluid and solid stuffing materials could bearing a relative stronger loading force, the volume of such tire could be correspondingly reduced, so that the weight of the wheel is lighter.

2. Another object of the present invention is to provide a deepened steel ring and a shallow tire. In the prior art, a large proportion of the volume of a steel-tired wheel is occupied by the rubber tire thereof, while the steel ring (basin) occupies a lesser volume, that is, generally less than one-third of the whole volume of the wheel. The outer tire is mounted to a steel ring by a chafer. Therefore, the volumetric space that extends beyond the chafer can not be supported by the steel ring.

Here, the wheel volume refers to the inner volumetric space, i.e. the inside space formed between the steel support and the covered tire, wherein the stuffing materials could be filled in such volumetric space for maintain the volume of such wheel and provide the outer cover a certain rigidity. It is well known there are three sides of a typical tire, namely, two sidewalls and a landing circumferential surface. A higher sidewall will pose several drawbacks, first of all, the tire is susceptible to deformation, the turning radius of landing portion of the tire will be shortened thus causing considerable turning resistance. Second, if the tire is blowout, the tire is flatted immediately; the relatively changed height of such tires is apt to cause undesirable accidents. Finally, the higher side surfaces will consume larger amount of rubber and impose the manufacturing difficulties.

According to the present invention, a deepened steel ring is introduced for encasing two sidewalls of the outer cover so as to create an inner cavity of a tire, i.e., the volumetric space of the tire. Only a small fraction of, or even no volumetric space, of the wheel is not supported by the steel ring. The steel ring may be embodied as a pair of clamping boards sandwiching a tire. It is noted that the two clamping boards may be unevenly sized, and may be welded together, or affixed by fastening means, such as screws, bolts, closing collars and clipping rings. The volumetric space defined by such clamping boards occupies at least a half of the total volumetric space. During the assembly process, the inner tube and outer cover of the tire are disposed between the clamping boards and mounted to the steel ring. The inside cavity may exceed at least half the volumetric space of the steel-tire wheel. Alternatively, the inner cavity defined by the outer cover may be less than half of the total volumetric space of the wheel. In some embodiments, there is no inner cavity defined by the outer cover, so that the outer cover is defined as a flat tire. In some embodiments, the circumferential edge of the steel ring is lower than the outer cover, with a range from 0.5 cm to 5 cm. That is to say, the diameter of the steel ring less than the outer cover by 1 cm to 10 cm. As a result, assembly and disassembly may be simplified in comparison with the prior art.

Furthermore, the deepened steel ring may provide various advantages. For example, the outer cover is not easily deformed, so that the radius of the landing portion of such a wheel is not reduced, at least less so than the prior art. As a result, safety and high performance may be ensured. Additionally, the two sidewalls of the outer cover of the tire are encased by the steel ring, i.e., at least half the height of the outer cover is supported. As a result, the distance from the steel ring to the ground (or the landing portion thereof) is within the range of 0.5 cm to 5 cm, so that the radius of such a wheel is not shortened significantly when a tire blowout occurs. Moreover, since the sire of the steel ring is increased, the outer cover is relatively small so that the manufacturing process may be simplified and costs may be reduced.

Another object of the present invention is to provide a flat outer cover of a tire, wherein the cross section of the inner cavity of the outer cover is squared, or the flat underside of the outer cover is transversely flatted, or upwardly curved. The inner tube and the outer cover of the tire are correspondingly matched in shape. Under a loading pressure, the outer surface of the wheel is transversely flatted. The outer cover could be embodied as flat shape, so two sidewalls of the outer cover are eliminated. The circumferential surface is flatly shaped having a pair of parallel inside and outside edges, so that the turning radius of such wheel are maintain unchanged during a rotational motion.

Another object of the present invention is to provide a blowout-proof device. An inner support structure is provided for replacing the steel ring to protect the wheel from a blowout. The inner support refers to a reinforcing member disposed within the wheel, adapted to succeed the stuffing materials to bear the full loading after a blowout. It is noted that the inner support could be disposed within the inner tube or outer cover. If the inner support is disposed within the outer cover, the inner tube could be eliminated. In case the inner tube is disposed within an inner tube, the inner structure should be placed before the molding or assembling process of such inner tube. Or otherwise, foaming techniques could be applied in the molded wheel. For instance, polyurethane foaming techniques could be used for preparing such inner support. Or otherwise, the clamping boards are provided for supporting such wheel, such clamping board has a height being at least half the height of the sidewall of the outer cover. There is a distance between the ground and the clamping board edge, ranging between 0.5 and 5 cm, so as to protect the wheel from a blowout accident.

It is worth to mention that the clamping board could be embodied as round shape, meshed board, T-shaped, bag shape, spherical shape, ring shaped. The inner support could be transversely disposed along the wheel, or longitudinally disposed along the axis of the wheel, or randomly disposed within the wheel. There could be one or more inner supports disposed within the wheel for associating with the stuffing materials to bear a load. The inner support could be made of metal, plastic, foam material, rubber, soft substance, or any compound thereof. The volume of the inner support should be less than the volume of the inner cavity. After the inner support is disposed, a quantity of fluid should be filled into the wheel to pack the remaining volumetric space so as to achieve the desirable compressed pressure.

Another object of the present invention is to provide a membrane inner tube or a plastic tire. The inner tube comprises a tube body being made of at least 50% membrane materials, wherein the membrane materials include plastic film, rubber film, synthetic film, having a thickness less than or equal to 1 mm. The volume of the tube body, under a normal circumstance, is no less than the volumetric space of the inner cavity of such wheel. The circumference of tube body cross section is larger than the circumference of the cross section of the inner cavity. Or otherwise, the tube body is overlappedly coated, or bond with the inner wall of the outer cover of the tire. Or the tube body is barrel shaped, having one opening end and a closing end, wherein the air valve is disposed orienting towards the opening end. Or the tube body is embodied as a tube shape, with two ends being closed, wherein the air valve is disposed between two ends. Or finally otherwise, there is a penetrating slot connected with the air valve to tube body.

The inner tube could be prepared by pressure molding, wherein one or more flat plastic membranes are interconnected with each other. Alternatively, the inner tube could be prepared by spirally coupling plastic membrane strap. On the other hand, an elongate plastic film tube could be prepared first, with a marker at a predetermined interval. After such elongate plastic film is segmented into a plurality of pieces, different pieces could be connected by gluing means, or thermo-connecting means.

For example, the air valve is disposed on the steel ring, and not connected to the inner tube. Such as, the air inlet is disposed on the steel ring; an air valve is coupled to the air inlet. It is noted that rubber tube of the conventional air valve of the art is replaced by the film tube. The film tube could be flattened by the pressure from inner tube so as to shut off the air valve. Here, the film tube could be made of plastic film, rubber film, and synthetic film. The film tube could be prepared as a multilayer texture. It is noted that air valve should be a straight hole for facilitating the filling process of fluid or semi-fluid substance.

Alternatively, the plastic film and synthetic film may overlap and coat the inner wall of the outer cover to be an inner tube. The volume of such an inner tube under a normal atmospheric pressure is larger or at least equal to the volume of the wheel under a normal atmospheric pressure. That is to say, the area surface of the inner tube is larger or equal to the area surface of the inner cavity of the wheel. The inner tube may be overlapped partially in the wheel. Here, the normal atmospheric pressure makes the inside pressure and outside pressure of the tire the same. During a fill process of the tire, the inner tube is free of pressure, the tension force is absorbed by the outer cover and is further limited within a volumetric space of the outer cover. The inner tube is not susceptible to blowout. Furthermore, the air-tightness will not be affected by tension force. Since the stuffing material is free of leakage, it is not necessary to have an air valve. Once the inner tube is filled with air, the life span of the tire will be enormously prolonged.

The outer cover may also be made of a plastic material, or a compound of plastic and rubber, or a synthetic material. If the outer cover is made of plastic rubber surface may be bonded with the plastic outer cover. The steel ring may be made of plastic with a high rigidity, or made of a compound material of plastic and metal. The plastic steel ring may be utilized in any vehicle requiring light weight and low cost.

The plastic outer cover comprises a rubber surface coat thereon, as if a tire is wearing a shoe, and the shoe is conveniently replaced. Furthermore, the outer cover and the surface coat may be bonded together or removably attached, and the outer cover and the surface coat can be fastened by the tension force after the filling process. Alternatively, the outer cover and the surface coat may be detachably engaged, so that the surface coat may be prepared by transparent, colored, opaque materials.

Another object of the present invention is to provide a tension band between the inner tube and outer cover. Within the art, the tension is bear exclusively by the outer cover of the tire, so that the outer cover is embodied to have a strong tension-resistant function. As a result, the cost of such outer cover is expensive, and the property of the wheel is affected by such outer cover, and the wheel is inevitably bulky. According to the present invention, a tension band is disposed between the inner tube and the outer cover for partially or entirely bearing the tension and bearing the pressure of the stuffing materials. The tension applied to the outer cover could be lessened, so that the lifespan of the outer cover could be prolonged. The tension band could be made of plastic, rubber, metal and any compound thereof. Furthermore, the tension band could be formed as gluing materials, metal meshed strip, fabric strip. It is noted that the tension band has a soft super-surface. The outer cover of the rubber tire could be adhered to the tension band, or otherwise, overlapped with the tension band by the inside tension.

Another object of the present invention is to provide a fluid injection apparatus for a steel-tired wheel, the fluid injection apparatus comprises an air pump (water pump), an injector, and a mud pump, which employs the mechanism well applied within the art.

Accordingly, the stuffing materials could be changed from time to time so that the load-bearing property of such steel-tired wheel could be improved, the volume of the tire is reduced and weight is lightened. The security could be guaranteed.

Another object of the present invention is to provide an efficient transmission method and apparatus to be used in trains, motored vehicles, motorcycles, bicycles, and for driving blades of fans, propellers, water pump, and air pump, as well as for driving entertaining wheels or wheeled toys.

The present invention provides a transmission method and apparatus for driving electrical vehicles, magnetized vehicles, air-driven vehicles, wherein the dynamic force provided by the engine is finally applied on peripheral edge of the wheel. The peripheral portion refers to a portion exceeding one third of the wheel diameter, and poisoned above the elevation of the center of the circle, or applied to the space beyond the circumferential edge of the wheel. Or otherwise, the stress mechanism or stress structure is positioned to railed wheel having peripheral portion. Or otherwise, a bearing gear is attached on the wheel axis, wherein the diameter of the bearing gear is at least no less than one third of the wheel diameter. Or otherwise, there is a drive gear defined on the axis of the wheel, and an inside-engaging ring is disposed on the steel ring, wherein the drive gear is adapted to drive the inside-engaging ring via an intermediate gear. Or otherwise, axis of the motor is further coupled with a drive gear which is directly engaging with the peripheral portion of the wheel. Or otherwise, the center axis of the drive gear is positioned beyond the wheel.

The "rim transmission" refers to transmission performed on the peripheral portion of the wheel. For instance, the wheel of a train comprises a wheel rim of a main wheel that is larger than the main wheel on which the transmission is provided from driving the wheel rim as well as the main wheel to rotate. The rim transmission is well recognized as a kind of gear-transmission, pulley transmission, friction transmission, bar-linkage transmission, chain-linkage transmission, and combined transmission thereof. Within the art, rim transmission is used on a commuting bus, in which an inside engaging ring is arranged along the inner wall of a steel ring of the wheel, and one end of a transmission shaft is connected with a drive gear having a relatively small diameter for outputting a dynamic force. It is worth to mention that the diameter of the drive gear is larger than the diameter of the transmission shaft and the drive gear is provided with a certain rigidity. One or more intermediate gears may be disposed between the drive gear and the inside engaging ring, and such an intermediate gear may be positioned above the drive gear or may be parallel with the center axis of the drive gear to form an inside gear arrangement. The drive gear drives the intermediate gear, and the intermediate gear drives the main wheel to rotate by the inside engaging ring.

While an electrical vehicle is moving, one electrical motor is capable of driving one or more wheel into motion, wherein the drive gear is coaxially coupled to a drive shaft of the motor to be driven so as to drive the wheel rim into rotation. Or otherwise, the main drive gear of the motor is extended into the steel ring, in which the inside engaging ring is defined, so that the drive gear is capable directly driving the steel ring into rotation. Or otherwise, the motor could be installed the vehicle body positioned adjacent to the wheels, or directly mounted to the drive axis. Accordingly, for most diesel engines, the transmission shaft could be shift from the center axis to the peripheral portion of a wheel.

In case of the transmission means is disposed on the peripheral portion of a train wheel, the stress or bearing portion will be positioned beyond the circumferential surface of the wheel, so the driving power could be significantly reduced. For those fans, propellers, a bearing gear could be coaxially disposed on the blade wheels to enable the rim transmission design.

Another object of the present invention is to provide a transmission method and apparatus, wherein the wheel comprises a bull wheel (large wheel) and a pony wheel (small wheel), the bull wheel is directly grounding formed, and the pony wheel is adapted for moving the vehicle body. It is noted that the pony wheel could be replaced by a trolley or a sliding block; alternatively, the bull wheel is functioned as a rotor of the wheel motor; or otherwise, the trolley or the sliding block, or the pony wheel is functioned as a stator of the wheel motor. Or otherwise, the wheel motor comprises a magnetized region; or otherwise, the wheel motor is adapted for driving the wheel rim; or otherwise, a vehicle, including electrical vehicle, wherein the motor for driving the vehicle is wheel motor or high speed motor, or varying-speed motor, or the electrical vehicle comprises an electricity quantity conversion device or an electrical shaft device.

It is noted that power efficiency of the rim transmission is limited by the predetermined length of the drive arm. The bull wheel, namely outside wheel or landing wheel, has a relative larger diameter in comparison with the pony wheel, and an inside cavity. The bull wheel is positioned outside the pony wheel so as to fully cover the pony wheel and bearing any dynamic force transferred from the pony wheel. The bull wheel is equipped with an outer cover. The bull wheel is moveably connected to the vehicle, that is to say the bull wheel is capable of move with respect to the vehicle body within a predetermined range. The bull wheel could transmit the power, and simultaneously be movable without derailing. The front-back movement of the bull wheel refers to the center axis of the bull wheel is shifting with respect to the vehicle body, while keep a stable elevation with respect to the ground during the rotational motion. Such front-back movement could be embodied by prolonging the round hole to form a slotted hole defined on the center axis of the wheel. There is several spacing method for limiting the bull wheel, one of such method is axis spacing, wherein a fixed shaft is provided to the bull wheel, and a slotted hole is defined on the vehicle body, so that the shaft is movable within the slotted hole for coupling the vehicle body.

Alternatively, a shaft is affixed to the vehicle body, the shaft is penetrating the center hole of the bull wheel and a slotted hole is defined on the bull wheel so that the shaft is restrictedly moveable within the slotted hole. Secondly, the peripheral spacing could be applied wherein the peripheral spacing device are provided to the vehicle body. Thirdly, the pony wheel spacing method introduces the spacing device on the pony wheel. For example, the pony wheel could be embedded into the grooves or ribs of the bull wheel to be affixed. The bull wheel and the pony wheel could be commonly located, wherein a pair of bull wheels is coaxially coupled through a pony wheel. The bull wheel should be of certain rigidity so that the spokes and supporting frame are not subject to deformation. The spoke structure of the bull wheel could be of plate type to strengthen the intensity and to enclose the interior. The transmission means is applied to the lower portion of the pony wheel. The pony wheel, also called inside wheel, is not adapted to be grounded. Here, the pony wheel refers to the small wheel being moveable within the bull wheel. The function of the pony wheel is to couple with the vehicle body and to bear the transmission force from the bull wheel, and finally driving the vehicle body moving along with the bull wheel. It is note that the pony wheel could be replaced by trolley or sliding block, wherein the trolley refers to the small sized vehicle disposed within the bull wheel and the sliding block refers to member having a sliding surface with respect to the bull wheel.

It is noted that diameter of the bull wheel and pony wheel are dependent according in applications. And the rolling mode of pony wheel within the bull wheel is of a variety of options. The first option is steel wheel rolling motion, like metal wheel rolled on a crawler track. The second option is tired wheel rolling motion, wherein the pony wheel comprises tires for facilitating the rolling motion. The third option is gear wheel rolling motion, wherein the bull wheel and pony wheel form an inside gear assembly. The fourth option is track rail rolling motion, wherein the pony wheel comprises a wheel edge being movably engaged on the rail defined on the bull wheel.

Here, the contacting surface between the pony wheel and bull wheel could be flat surface, or be of groove, ridge, rib, and teeth structure. The pony wheel is rotatably mounted to the vehicle body by the conventional coupling means for mounting the wheels to the vehicle body. Alternatively, there is an affixed shaft defined in the pony wheel, wherein the shaft is rotatable within the vehicle body. Or otherwise, the stationary axis is positioned within the vehicle body, the pony wheel or trolley is rotatable along the stationary axis. Or otherwise, the bull wheel and the pony wheel are fixedly connected; the sliding block replaces the pony wheel. While the gear structure is applied, the pony wheel could share the inside engaging ring of the bull wheel so as to form two inside gear assembly. The inside engaging ring employs the linkage chain structure, wherein the linkage chain is disposed within the bull wheel to replace the inside engaging ring, and the pony wheel is embodied as a curved sliding block, slidably moveable within the bull wheel. The trolley comprises a plurality of trolley wheels, spacedly allocated along the inner circumferential edge of the bull wheel. The bull wheel is not rotating along the axis, or leveraged along the axis, but leveraged by the pony wheel, so that the center axial shaft is front and back movable with respect to the vehicle body for ensuring the transmission requirement.

Compared with the traditional techniques, the transmission apparatus and method according to the present invention is energy efficient, power savable. As a result, the combustion engine or electrical engine could utilize less powered and less consumption motor to achieve desirable working output. The present invention welcomed for solving the energy crisis all around the world. Furthermore, the variety of transmission means mentioned in the present invention could be widely used in all applications, for example, for a common bus, only the change of the wheel will enable such rim transmission into embodiment.

Furthermore, the transmission efficiency of the bull wheel is impressive for solving the long time difficulty of lower efficiency of the electrical vehicles. The leveraged dynamic power further facilitates the maneuverability of such vehicles. In an inclined slope, the bull wheel will provide a relative energized power to overcome the steep slop and prolonged slope, and well control the advancing velocity of the vehicle. As a result, the brake function of conventional vehicle will be off the burden.

An energy consuming body, said energy consuming body refers to a main body consumes dynamic force energy, said energy consuming body includes transport facility and mobile communication equipment, said transport facility includes vehicle and vessel, said mobile communication equipment includes mobile phone; said dynamic force energy includes electric energy, hydrogen and oil, said electric power includes energy from storage battery, dry battery and fuel cell battery, said hydrogen includes hydrogen gas and liquid hydrogen, said oil includes fuel oil, said energy consuming body comprises energy container, said energy container refers to the container which stores said dynamic force energy, said energy container includes storage battery, hydrogen storage container and gas tank; said energy consuming body uses said energy as dynamical force energy, said dynamic force energy refers to the main energy for driving said energy consuming body to work, said method for supplying dynamic force energy refers the method to supply the dynamic force energy; the energy containers of the same kind of energy consuming body have a universally standard, so the energy containers have universal property and can be exchanged to use then achieve complete replacement, quick replacement and quick obtaining of energy;

two or more than two storage batteries or dry batteries used in vehicle or vessel are connected and combined to become a universally standard and replaceable storage battery group which is a fixed complete unit, so the storage battery groups have universal property; said vehicle or vessel comprises power source cavity corresponding to said storage battery group, said electrical power source refers to storage battery group, said storage battery group is fixed in the power source cavity; there are a plurality of energy exchanging stations provided along a route on which the energy consuming body traveling, wherein each of the energy exchanging station reserves a plurality of full charged electrical power sources, said full charged electrical power source refers to full charged storage battery group, the storage battery group lack in power energy refers to depleted electrical power source, so that when the storage battery group of said vehicle or vessel is lack in electrical power energy, said vehicle or vessel comes in said energy exchanging station, the depleted electrical power source of the vehicle or vessel could be replaced by the full charged electrical power source of the energy exchanging station, said electrical power source can achieve complete replacement, quick replacement and quick obtaining of energy; or Said vehicle is hydrogen-powered vehicle or gas engine vehicle, said dynamic force energy is hydrogen or oil; the hydrogen-powered vehicle or gas engine vehicle comprises a universally standard and replaceable energy container, so the energy containers have universal property; there are a plurality of energy exchanging stations provided along a route on which the energy consuming body traveling, wherein each of the energy exchanging station reserves a plurality of full charged energy containers, said full charged energy container refers to hydrogen storage container with full hydrogen or gas tank with full oil, so that when the vehicle is lack in hydrogen or oil, said vehicle comes in said energy exchanging station, the hydrogen storage container lack in hydrogen or gas tank lack in oil of said vehicle could be replaced by the hydrogen storage container with full hydrogen or gas tank with full oil of the energy exchanging station, said energy container can achieve complete replacement, quick replacement and quick obtaining of energy; or said energy consuming body is mobile phone, said mobile phone comprises a universally standard electric coupling structure or/and battery, so the electric coupling structures or/and batteries have universal property, all kinds of different mobile phones can be exchanged to use when they obtain dynamic force energy; or there are a plurality of energy exchanging stations, each of the energy exchanging stations reserves a plurality of full charged electrical power source, said full charged electrical power source refers to full charged mobile phone battery, the mobile phone battery lack in electrical power energy refers to depleted electrical power source, so that when the mobile phone is lack in electrical power energy, the mobile phone is taken to the energy exchanging station, the depleted electrical power source of mobile phone could be replaced by the full charged electrical power source of the energy exchanging station, said electric coupling structure or/and electrical power source can achieve complete replacement, quick replacement and quick obtaining of energy.

In the energy consuming body, the storage battery group comprises at least one of the following features:

(1) the storage battery group comprises at least one wheel and/or an engine;

(2) the storage battery group comprises a uniform logo including special characters or special patterns;

(3) the storage battery group comprises an outer casing with a tube style, a box style, a board style, or a drawer style, or a protective coating;

(4) the storage battery group comprises an electric power display unit or an energy economizing unit, or the storage battery group comprises an electric change-over switch;

(5) the storage battery group comprises a hook or handle, or comprises a hanging hook structure, or comprises a stricture that is leak-proof and air-tight;

(6) the storage battery group comprises a convex bar or groove for interconnection;

(7) the storage battery group comprises an electric coupling structure and/or a coupling structure;

(8) the storage battery group comprises a universal standard for a plurality of vehicles;

(9) the fixed complete unit is frame-shaped, box-shaped, barrel-shaped, drawer-shaped or cabinet-shaped;

(10) the storage battery group is fixed in the vehicle, and when the electrical power source is replaced, the vehicle with a depicted electrical power source may be replaced by a vehicle with a fully charged electrical power source;

(11) the more than one storage battery groups are charged together or the storage battery group is charged during an off-peak period of electricity consumption.

In the energy consuming body, the vehicle and the power source cavity comprise at least one of the following features:

(1) the vehicle has two or more power source cavities, in which openings of the power source cavities point down, or up, or back, or alternatively, the replaced electrical power source is hung on the vehicle;

(2) the vehicle has two or more replaced electrical power sources, or the vehicle has spare replaced electrical power sources, or the vehicle has a fixed electrical power source, in which the fixed electrical power source refers to the electrical power source fixed in the vehicle;

(3) the power source cavity has an auto-eject device or an auto-release device, or the power source cavity has a hydraulic pressure device, a pneumatic device or an electric driver, or the power source cavity has a damping device.

In the energy consuming body, the energy exchanging station uses a wheel style transport implement or a pendulum style implement to remove the depleted electrical power source and install the fully charged electrical power source to the vehicle. The depleted electrical power source being removed and the fully charged electrical power source being installed may be received in different power source cavities at approximately the same time. The wheel style transport implement includes a wheel style vehicle. The pendulum style transport implement includes a gantry crane.

In the energy consuming body, wherein the mobile phone and the mobile phone battery comprise at least one of the following features:

(1) the mobile phone comprises a battery receiving space with a universal standard;

(2) the electric coupling structure includes an electrical plug and/or an electrical socket;

(3) the universal standard includes at least one of a universal shape, a universal structure, a universal size, and a universal working course;

(4) more than one depleted mobile phone batteries are charged together, or more than one depleted mobile phone batteries are charged during an off-peak period of electricity consumption.

In a method for supplying dynamic force energy to an energy consuming body, the energy consuming body refers to a main body that consumes dynamic force energy. The energy consuming body is a transport facility or a mobile communication equipment. The transport facility can be a vehicle or a vessel. The mobile communication equipment can be a mobile phone. The dynamic force energy can be electric energy, hydrogen or oil. The electric power refers to energy stored in a storage battery, a dry battery or a fuel cell battery. The hydrogen can be hydrogen gas or liquid hydrogen. The oil can be fuel oil. The energy consuming body comprises at least one energy container. The at least one energy container refers to a container which stores the dynamic force energy. The energy container can be a storage battery, a hydrogen storage container or a gas tank. The energy drives the energy consuming body to work. The energy containers thereof are provided with a universal standard, so the energy containers have universal properties to allow for quick replacement and quick obtaining of energy; Two or more storage batteries or dry batteries used in a vehicle or vessel are connected and combined. The vehicle or vessel comprises a power source cavity corresponding to a storage battery group. The electrical power source can be a storage battery group, the storage battery group is fixed in the power source cavity. There are a plurality of energy exchanging stations which are positioned along a route that is traveled on by the energy consuming body, in which each of the energy exchanging station has a plurality of full electrical power sources, each of the full replaceable energy containers in any one of the energy exchanging stations being fully filled with dynamic force energy.

When the dynamic force energy of the at least one replaceable energy container of the energy consuming body is depleted to thereby become a depleted replaceable energy container of the energy consuming body, and the energy consuming body is at one of the energy exchanging stations, the depleted replaceable energy container of the energy consuming body is replaced with one of the full replaceable energy containers in the energy exchanging station so that the energy consuming body can be driven to work by the dynamic force energy in the full replaceable energy container used to replace the depleted replaceable energy container.

The vehicle is a hydrogen-powered vehicle or gas engine vehicle. The dynamic force energy is hydrogen or oil. The hydrogen-powered vehicle or gas engine vehicle comprises at least one replaceable energy container, so the replaceable energy containers have a universal standard;

There are a plurality of energy exchanging stations which are positioned along a route that is traveled on by the energy consuming body, in which each of the energy exchanging station has a plurality of full energy containers. The full energy container can be a hydrogen storage container with that is filled with hydrogen or a gas tank that is filled with oil Each of the full replaceable energy containers in any one of the energy exchanging stations may be fully filled with hydrogen or oil.

When the hydrogen or oil of the at least one replaceable energy container of the energy consuming body is depleted to thereby become a depleted replaceable energy container of the energy consuming body, and the energy consuming body is at one of the energy exchanging stations, the depleted replaceable energy container of the energy consuming body is replaced with one of the full replaceable energy containers in the energy exchanging station so that the energy consuming body can be driven to work by the hydrogen or oil in the full replaceable energy container used to replace the depleted replaceable energy container.

The energy consuming body is a mobile phone. The mobile phone comprises a universal standard electric coupling structure and at least one battery There are a plurality of energy exchanging stations which are positioned along a route that is traveled on by the mobile phone. Each of the energy exchanging stations holds a plurality of batteries, that each of which is fully filled with electrical power.

When the electrical power source of the at least one battery of the mobile phone is depleted to thereby become a depleted battery of the mobile phone, and the mobile phone is at one of the energy exchanging stations, the depleted battery of the mobile phone is replaced with one of the full batteries in the energy exchanging station so that the mobile phone can be driven to work by the electrical power source in the full battery used to replace the depleted battery.

In the method for supplying dynamic force energy to an energy consuming body, the storage battery group comprises at least one of the following features:

(1) the storage battery group comprises at least one wheel and/or an engine;

(2) the storage battery group comprises a uniform logo including special characters or special patterns;

(3) the storage battery group comprises an outer casing with a tube style, a box style, a board style, or a drawer style, or a protective coating;

(4) the storage battery group comprises an electric power display unit or energy economizing unit, or the storage battery group comprises an electric change-over switch;

(5) the storage battery group comprises a hook or handle, or comprises a hanging hook structure, or comprises a structure that is leak-proof and air-tight;

(6) the storage battery group comprises a convex bar or groove for interconnection;

(7) the storage battery group comprises an electric coupling structure and/or a coupling structure;

(8) the storage battery group comprises a universal standard for a plurality of vehicles;

(9) the fixed complete unit is frame-shaped, box-shaped, barrel-shaped, drawer-shaped or cabinet-shaped;

(10) the storage battery group is fixed in the vehicle, and when the electrical power source is replaced, the vehicle with a depleted electrical power source may be replaced by a vehicle with fully charged electrical power source;

(11) the more than one storage battery groups are charged together, or the storage battery group is charged during an off-peak period of electricity consumption.

In the method for supplying dynamic force energy to an energy consuming body, the vehicle and the power source cavity comprise at least one of the following features:

(1) the vehicle has two or more power source cavities, in which openings of the power source cavities point down, up, or back, or alternatively, the replaced electrical power source is hung on the vehicle;

(2) the vehicle has two or more replaced electrical power sources, or the vehicle has spare replaced electrical power sources, or the vehicle has a fixed electrical power source, in which the fixed electrical power source refers to the electrical power source fixed in the vehicle;

(3) the power source cavity has an auto-eject device or an auto-release device, or the power source cavity has a hydraulic pressure device, a pneumatic device or an electric driver; or the power source cavity has a damping device.

In the energy consuming body, the energy exchanging station uses a wheel style transport implement or a pendulum style implement to remove the depleted electrical power source and install the fully charged electrical power source to the vehicle. The depleted electrical power source being removed and the fully charged electrical power source being installed may be received in different power source cavities at approximately the same time. The wheel style transport implement includes a wheel style vehicle. The pendulum style transport implement includes a gantry crane.

In the energy consuming body, the mobile phone and the mobile phone battery comprise at least one of the following features:

(1) the mobile phone comprises a battery receiving space with a universal standard;

(2) the electric coupling structure includes an electrical plug and/or an electrical socket;

(3) the universal standard includes at least one of a universal shape, a universal structure, a universal size, and a universal working course;

(4) more than one depleted mobile phone batteries are charged together, or more than one depleted mobile phone batteries are charged during an off-peak period of electricity consumption.

Accordingly, a primary object of the present invention is to provide a convenient and efficient energy supplying method and devices for embodying such an energy supplying method. The present invention provides an energy conversion method so as to replace the conventional energy charging method. More specifically, the present invention provides a method for an energy-consuming body to obtain dynamic force energy, wherein the energy-consuming body refers to a main body supplied by energy to be performed, and the energy can be electrical power, fuel gas, or fuel oil. Here, the electrical power is energy stored in a storage battery, a dry battery, or a fuel cell battery. The fuel gas is combustible gas, and the fuel oil is combustible gas. Therefore, the method provides an energy-consuming body comprising a universally sized energy container, and a plurality of energy exchanging stations which are positioned along a route that is traveled on by the energy-consuming body. Each of the energy exchanging stations holds a plurality of full energy containers, each of the full replaceable energy containers in any one of the energy exchanging stations being fully filled with dynamic force energy. When the dynamic force energy of the at least one replaceable energy container of the energy consuming body is depleted to thereby become a depleted replaceable energy container of the energy consuming body, and the energy consuming body is at one of the energy exchanging stations, the depleted replaceable energy container of the energy consuming body may be replaced with one of the full replaceable energy containers in the energy exchanging station.

Accordingly, the charged energy container refers to the container having sufficient energy, and the depleted energy container refers to the container having insufficient energy. The container refers to means for containing or controlling energy. The energy container can be a storage battery, a dry battery, a gas storage container, an oxygen storage container or any power source for supplying electrical energy. In the present invention, the energy-consumption body equals to energy-obtaining body. As a result, the empty gas tank, or the depleted storage battery may be referred to as the depleted energy container.

Accordingly, the present invention provides a method for a vehicle or a vessel to obtain dynamic force energy. The dynamic force energy refers to an electrical power source for driving the vehicle and vessel in operation. The dynamic force energy comprises a storage battery, a dry battery, or a fuel cell battery. The vehicle and vessel are provided with a universally sized electrical power source, and a plurality of electricity charging stations are provided at predetermined locations. Each of the stations has sufficient electrical power sources, so that when the vehicle or the vessel is out of electrical power, the user may dock the vehicle or the vessel into one of the electrical charging stations and the depleted power source can be replaced with a replenished power source. Alternatively, the depleted power source may be recharged at the electrical charging station.

According to the present invention, the energy power sources can be exchanged at one of a plurality of energy exchanging stations, so that the depleted or shorted power source may be replenished. Here, the power exchanging vehicle refers to a kind of vehicle for installing and delivering an energy power source to an energy-consuming vehicle. The electrical power source refers to the electricity supplying means, such as a storage battery.

Accordingly, such an energy exchanging method may be analogous to a method of exchanging an empty fuel gas container with a full gas container at a gas station. Another approach is to exchange a vehicle having a depleted power source with another vehicle having a full power source. For example, if an electrical vehicle has an insufficient amount of energy, the driver may drive such a vehicle to a nearby energy exchanging station to change to a new vehicle, instead of a replacing with a fully charged energy power source, as mentioned above.

Therefore, the conventional gas tank, or the fuel gas container of the common vehicle may be prepared with a universal size and shape. When a car is short of gas, the driver may find a nearby energy exchanging station to exchange to a new gas tank, rather than refill the gas tank. Preferably, such a method is effective vehicles using compressed gas. Typically, a long period of time is required to refill such a vehicle using compressed gas. With the energy exchanging method, the vehicle may be reenergized immediately at the energy exchanging station.

Another object of the present invention is to provide a replaceable battery, which is universally sized and shaped, being complied with standard so as to be used as a ready energy source in routine applications. The replaceable battery comprises an attaching coupler for detachably mounting to an energy-consuming body, an electrical coupler which is electrically connected with the energy-consuming body so as to outputting energy to the energy-consuming body, and a wheel assembly provided to the battery for facilitating the movement of the battery, and a casing for preventing the battery from being damaged.

Generally, the battery comprises two or more battery units combined together, or otherwise, comprises only one bulky battery unit. In addition, the battery of the present invention is a kind of replaceable battery disposed to a vehicle body. Unlike traditional vehicle battery having recharging device provided thereon, the replaceable battery is adapted to be detachably mounted to the vehicle body. Whenever the battery is energy shorted, the user could find a nearby energy station to remove such depleted battery and exchange a full charged battery.

The replaceable battery is of universal standard, i.e. all replaceable battery are universally sized, shaped and structured. The attaching arrangement is embodied as an instant attach/detach arrangement, which employs the weight or springing force for efficiently and timely positioning the battery to the vehicle body. It is noted that there are several coupling structure available for mounting the battery to the vehicle body, such as the battery is embodied as a drawer to be inserted into a receiving cavity defined on the vehicle body, or otherwise, the battery is detachably hanged to an engaging loop provided to the vehicle body, and so on.

Furthermore, the replaceable battery comprises a plurality of battery units, and an outer casing for fastening the battery units to form a single battery stack. The replace battery could be sealed off so as to block any impurity, water, dust and electricity leakage. Accordingly, the corresponding coupling structure and receiving space are provided at the vehicle body for efficiently and accurately receiving and affixing the replaceable battery.

It is noted that electricity outputting means of such replaceable battery are of universal standard too. That is to say, the electricity outputting plug of the battery, the plug socket received in the vehicle body, the plug/socket coupling rigidity and coupling manner should be standardized. What is more, the electricity outputting means of the battery should be coupled with a secure and reliable manner, so as to withstand an extensive and turbulent shaking.

It is well known that the energy obtaining method for electricity power sources is a recharging process. According to the present invention, while the battery is recharged, the recharging time, process, and location are different. According to the present invention, for the recharging process, the electricity power sources may be collected together, and arranged with the same standard to allow for manufacture on an industrial scale. For instance, the recharging process may be done in periods avoiding the energy consumption peak times so as to improve the charging quality, thereby optimally utilizing electricity energy.

Another object of the present invention is to provide a vehicle, a vessel, or an airplane equipped with such replaceable power sources. The power source storage chamber is correspondingly sized, shaped, and structured to receive such replaceable power sources. Also, the vehicles and vessels may be provided with more than one power source supply units thereon, so that when one power source supply unit is out of energy, the other power source supply units in reserve may be used for power supply.

Another object of the present invention is to provide a method for supplying energy to a rechargeable dry battery. The depleted dry battery is collectively charged at a predetermined location, such as an energy exchanging station. As a result, the power charging process may be arranged at an off-peak period of electricity consumption.

Another object of the present invention is to provide a power driven bicycle, the power driven bicycle comprises a power source unit. The power source unit may be a built-in power source, or a replaceable power source.

Accordingly, the present invention solves the conventional drawbacks of the energy charging process. The energy charging process is efficiently accomplished at the energy exchanging stations. Since the energy exchanging process is so prompted, the cruising continuality of the energy consuming body, such as a vehicle, could be significantly improved. Furthermore, the energy exchanging stations could be dispersedly allocated, so that energy exchanging body could be energized from time to time.

What is more, a lot of conventional energy consuming objects, such as mobile phones, electrical means, home electrical appliances, could be charged according to this method. The conventional charging device installed into the energy consuming body could be eliminated. Furthermore, the present invention provides an intermediate approach to solve the electricity of the combustive engine. And such charging process could be arranged at a power consumption valley time.

The present invention introduces a method for conserving the power network, electrical energy storage and conversion. It is well known there are energy consumption peak time and valley time. However, the energy supplying and conserving system are not arranged in such an energy consumption valley time.

Another object of the present invention is to provide a method for supplying and conserving valley time electricity energy to a storage battery, when the electricity demand is less than the electricity supply, the storage battery will be charged, on the other hand, if the electricity is more than the electricity supply, the storage battery will instead charge the power network. The reciprocal transferring process could be automatic, or be manually operated. It is noted that the storage battery is of giant size having a plurality of dry battery unit.

Another object of the present invention is to provide a power network energy conserving system, comprising a power network, a storage battery electrically connected with the power network, and an electrically charging device disposed between the power network and the storage battery, wherein during an electricity consumption peak, the storage battery is charged by the power network through the charging device, and during an electricity consumption valley, the storage battery is capable of supplying electricity energy to the power network.

Accordingly, the present invention broadens the application fields of the storage battery. The transportation means, mechanic equipment, illumination means, electrical appliances, could be charged by the storage battery.

Meanwhile, the power network could be disposed nearby the application locations for supplying electrical energy to storage battery, during a power consumption valley time, the storage batter could be automatically charged. For example, the punch machine could be provided with such storage battery, during a power consumption valley time, the storage battery is automatically charged so as to drive the punch machine into performance later. In addition, the vehicle could be supplied by the storage battery, which is replaceable at energy exchanging station.

These and other objectives, features, and advantages of the present invention will become apparent from the following detailed description, the accompanying drawings, and the appended claims.

BRIEF DESCRIPTION OF THE DRAWINGS

FIG. 42-FIG. 43 are schematic views illustrating the wheel rim/wheel axis transmission structure.
FIG. 44-FIG. 48 are schematic views illustrating three kinds of teeth engaging plates.
FIG. 53-FIG. 59 are schematic views illustrating the wheel rim transmission structure of the bicycle.
FIG. 60 illustrates the wheel rim transmission structure of entertainment wheel.
FIG. 61 illustrates the wheel rim transmission area.
FIG. 73-FIG. 75 illustrate coupling structure between energy consuming vehicle and power source.
FIG. 76-FIG. 79 illustrate two types of coupling structure.
FIG. 80-FIG. 81 illustrate the power source assembly.
FIG. 82-FIG. 83 illustrate two types of plug/socket arrangement for coupling the power source to the energy consuming vehicle.

DETAILED DESCRIPTION OF THE PREFERRED EMBODIMENT

Figure 1:
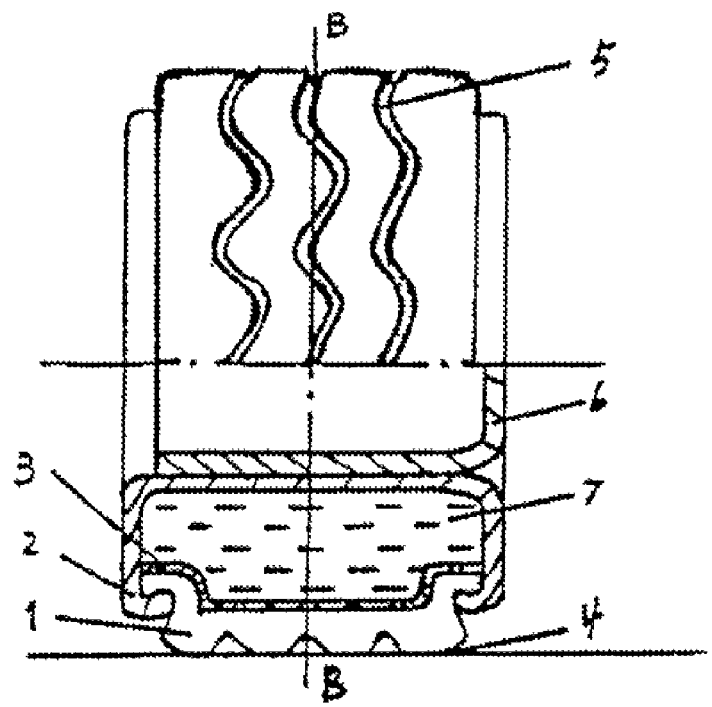
FIG. 1 is schematic view of the tire stuffed with fluid materials according to the present invention.
Figure 2:
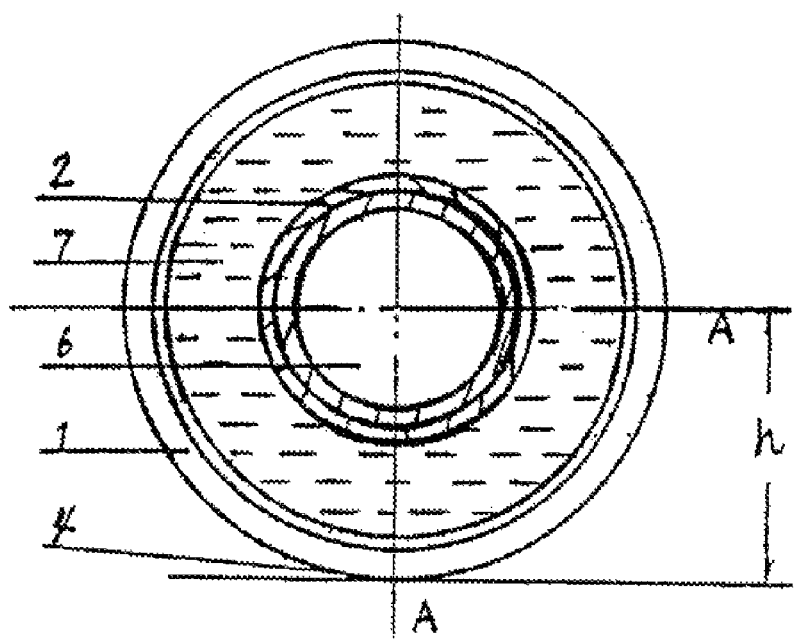
FIG. 2 is schematic view of the tire stuffed with fluid materials according to the present invention.

Referring to FIG. 1 and FIG. 2, the fluid-stuffed steel-tired wheel according to the preferred embodiment of the present invention is illustrated. The outer cover 1 and the steel ring 2 are detachably engaged by conventional means within the art. A plastic membrane 3 is overlappedly coated on the inner wall of the outer cover 1 so as to replace the conventional inner tube of a tire. It is noted that there is an engaging interface defined between the plastic membrane 3 and the inner wall of the outer cover 1. The landing portion 4 of the outer cover 1 is longitudinally flatted biasing the ground.

Here, the landing portion refers to the circumferential surface of the outer cover 1 being contacted with the ground, so that a rotational motion of such wheel will enable turning part of the outer cover to land on the ground. The tire tread 5 is defined on the circumferential surface of outer cover 1. The steel ring 2 is coupled to the wheel rotational axial shall through a steel basin 6 as shown in FIG. 1. It is noted that the steel ring 2 and the steel basin 6 could be integrally formed for facilitating the manufacturing process.

The two sidewall of the outer cover 1 are relative shortly defined, so that only a smaller volumetric space are formed between two sidewalls of such outer cover 1. Preferably, the volumetric space formed between two sidewalls of the outer cover 1 occupy no more than one fifth of volumetric space of inner cavity of the wheel. Furthermore, the outer cover 1 could be defined as a flat shaped element, therefore no volumetric space could be formed at all by the outer cover 2.

Contrarily, the steel ring 2 defines a relatively larger volumetric space within the wheel, preferably, more than half of the whole volumetric space of the inner cavity. As a result, the circumferential edge of the steel ring 2 could be extending close to the ground in a range lower than 5 cm. In case of a blowout accidents happened, the circumferential edge of the steel ring could land easily without causing any uneven wheels so that the security could be ensured.

FIG. 2 is the B-B sectional view of FIG. 1, the fluid 7 is filled into the inner cavity within the wheel. Here, the fluid 7 is selected from a group consisting of semi-fluid, mud, oily-fluid, jelly-fluid, cream, gluing substance, soft substance, and so on. The soft substance could be rubber and be integrally formed with outer cover 1. The wheel according to the present invention could be employed in any transporting means, such as vehicles and airplanes. Some bulky and light weight solid substance, i.e. solid substance with less specific gravity, could be mixed into the fluid 7.

If the landing portion 4 is concavely curved up, the turning radius on the landing portion of the wheel, i.e. the height of h, should be correspondingly shortened. However, the radius of other portion of the wheel are not shortened; instead, a from portion should be prolonged. As a result, the rotational resistance will be increased. If the landing radius of the wheel are maintained unchangeable, other portion positioned adjacent to the landing portion are well above the ground, which is apt to be gravitating towards the ground, so as to facilitate the rolling motion of such wheel.

For the conventional air-filling steel-tired wheel, the landing portion is inevitably flatted, and the turning radius will be significantly shortened. According to the present invention, the landing portion will be laterally straightened, so that the turning resistance is reduced. It is noted that as the number of wheel increased, the loading pressure on each of the wheel will be lessened, so that the landing radius will be maintained at a stable level. The present invention just utilizes this mechanism.

The plastic membrane 3 could be changed to plastic membrane inner tube which is shaped and sized matching with the inner cavity defined by the outer cover 1. The thickness of the plastic membrane is no more than 1 mm. It is noted that volume of the inner tube under normal circumstance is larger than the volume of the inner cavity of the wheel, so that tension force from the stuffing materials will not cause the inner tube into deformation as well as damage. What is more, the stuffing materials are not protruded outside, so the permeability will well maintained.

Figure 3:
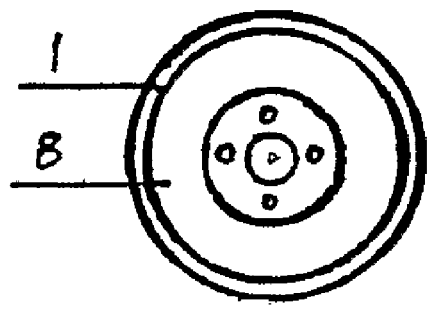
FIG. 3 is schematic view of the wheel associated with the clamping boards according to the present invention.
Figure 11:
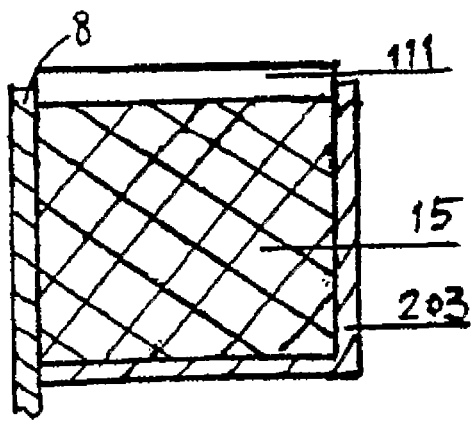
FIG. 11 is a sectional view showing the cross section of the foamed inner tube.

As shown in FIG. 3, a pair of clamping boards 8 is fastened to two sides of wheel by the screw-bolt means. Here the clamping board 8 is functioned to replace conventional steel ring to form a cavity to protect the outer cover, thereby reducing the longitudinal deformation of the landing portion, to ensure the turning radius maintained unchangeable. In case of a blowout accident happened, the clamping board could engage into the ground for security purposes. Alternatively, one side of the wheel could be installed a clamping board, while another side of the wheel is disposed a steel ring as shown in FIG. 11. This kind of design is to facilitate the assembly and disassembly process for mounting the tire onto steel ring. Furthermore, the clamping board 8 could protect the tire from foreign forces. And the clamping board 8 and steel ring could comprise reinforcement element and a decorating layer, or a cover. The clamping board 8 could be affixed to the tire by conventional fastening means. Commonly, the diameter of the clamping board 8 is less than the diameter of the outer cover 1 to an extent from 1 to 10 cm. Finally, the conventional tire could be equipped with such clamping board to provide a safer performance.

Figure 4:
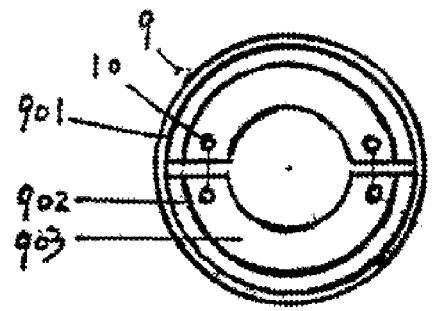
FIG. 4 illustrates the T-shaped inner support structure according to the present invention.
Figure 5:
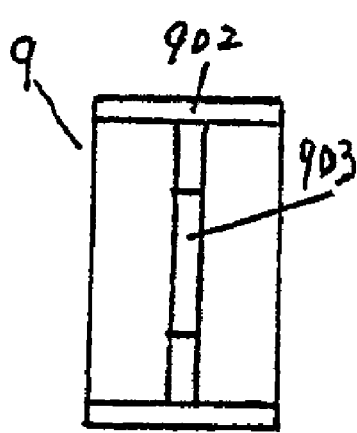
FIG. 5 illustrates the T-shaped inner support structure according to the present invention.
Figure 6:
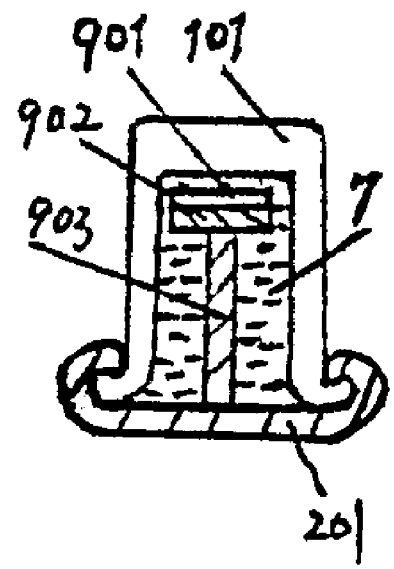
FIG. 6 illustrates the T-shaped inner support structure according to the present invention.

As shown in FIG. 4, FIG. 5 and FIG. 6, the T-shaped inner support comprise at least two members, namely, a vertical supporting member 903 and a lateral reinforcing member 902, wherein the vertical supporting member 903 is clipped on the steel ring 201, and the lateral reinforcing member 902 is disposed overlappedly along the inner circumferential surface of the outer cover 101. An outer ring 901 is provided for coupling two T-shaped inner supports 9 together. In short, the T-shaped inner support 9 is adapted to protect the outer cover from being damaged after a blowout accident. It is noted that the outer ring 901 is overlapped coated on the outer circumferential surface of the outer cover 101, and made of plastic, rubber, fabric or compound thereof. In case of a blowout accident happened, the vertical supporting member 903 will transfer the grounding force to the steel ring 201. The lateral reinforcing member 902 has a relatively larger area, so that a layer of rubber or plastic could be coated thereon for protecting the outer cover. Under a normal circumstance, there is no foreign forces applied on the T-shaped inner support 9, and the T-shaped inner support is clipped on the steel ring and the outer ring 901 encased the T-shaped inner support and affixed onto the steel ring 201. There are connecting slot 10 defined on the vertical supporting member 10 so as to fasten two inner support 9 onto the steel ring 201.

Figure 7:
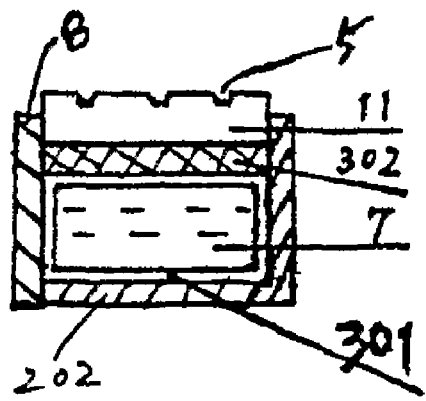
FIG. 7 is a sectional view of the fluid-stuffed tire according to the present invention.

As shown in FIG. 7, the clamping board 8 is embodied as one side of the steel ring 202, and the plastic membrane inner tube 301 is encased by the steel ring 202. The cross section of the plastic membrane inner tube 301 is squarely shaped, wherein the outer cover 11 and the steel ring 202 are directly biasing with each other, so that the chafer design widely available in the prior art for coupling the steel ring (basin) and tire are unnecessary and eliminated. The manufacturing process could be simplified and the expenses are much cheaper according to the present invention. It is noted that a cushion pad could be provide adjacent to the plastic membrane inner tube for protecting the inner tube being worn off. Such cushion pad could be made of metal, plastic, rubber and fabric. Furthermore, the cushion pad is shaped and sized matching the inner tube.

At the same time, a reinforcement arrangement could be used for the steel ring 202, such as binding or trimming process could be employed for protecting the steel ring edge, and a curved edge design is much desirable. Therefore, the bordering edge of the steel is not susceptible to be deformed or seriously damaged.

The inner tube 301 could be further divided into two or more parts for simplifying the assembly and maintenance. In case of a blowout accident happened, the inner tube could be utilized as temporary inner support. The stuffing materials for the inner tube could be selected from cream substance, gluing substance being pre-treated to be filled into such steel ring. The outer cover 11, encasing around the circumferential of the wheel, has certain rigidity and elasticity, and is tight contacted with the tension layer 302.

The chafer structure according the present invention refers to the interlocking structure coupling the outer cover and steel ring. The tension layer 302 is disposed between the inner tube and outer cover, and together with the outer cover, for encasing the inner tube so as to retain the pressure applied by the stuffing materials of the inner tube. It is noted that the retention layer could be adhered to the outer cover, so that when the outer cover is changed, the tension layer could be torn off from the outer cover to be reused. The tension layer 302 could be prepared by the techniques of manufacturing belt. Here, the outer cover 11 is flat shaped, so there is no inner cavity defined, and the tread is defined on the outer circumferential surface of the outer cover.

Figure 8:
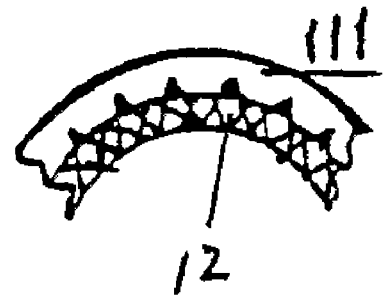
FIG. 8 is a partial sectional view showing the plastic outer cover according to the present invention.

As shown in FIG. 8, the plastic outer cover 12 is plied with a rubber surface 111, which is zigzagged engaging with the plastic outer cover 12. After the wheel is compressed, the tension will enable the rubber surface securely affixed the plastic outer cover. If there is no gluing means are applied, upon the compress is unloaded, the rubber surface is apt to be detached from the plastic outer cover conveniently. By the way, the plastic outer cover could be replaced by a tension layer, or not engagingly covered with such rubber surface 111. So the outer cover could be embodied as a kind of plastic or synthetic outer cover.

Figure 9:
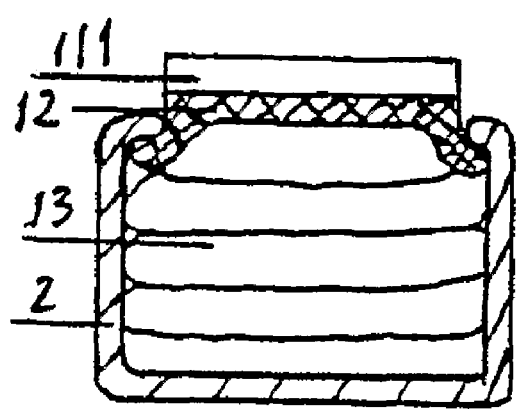
FIG. 9 is a sectional view showing the cross section of the tire having an inner support according to the present invention.
Figure 10:
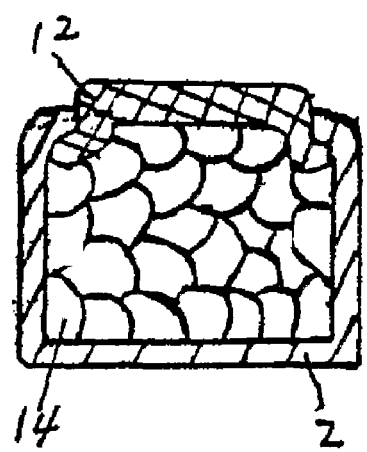
FIG. 10 is a sectional view showing the cross section of the tire having an inner support according to the present invention.

Referring to FIG. 9 and FIG. 10, the baggy shaped inner support 13 and the spherical shaped inner support 14 are utilized as the inner tube. Since the convention single inner tube has been divided into a plurality of individual units, the blowout chances would be further restricted to a lower level, since such plurality of individual units could not blowout simultaneously. And meanwhile, such individual units could be embodied as inner support for securing the overall structure of the wheel.

As their name implied, the baggy inner support 13 is pocket shaped and the spherical inner support is sphere shaped. Such sub-inner tube could be disposed freely within the inner cavity, just acting a flowing medium for bearing load pressure and for preventing any blowout accident.

Furthermore, the inner support could be embodied as strap shaped, or segment shaped, so that such sub-inner support could be winded up within the inner cavity to function as an inner tube and an inner support. It is noted that stuffing materials filled into such sub-inner tube are as same as the stuffing materials of the present invention.

The bagged shaped inner support could be prepared by one or more, depending on different conditions. Such sub-inner tubes could be longitudinally or transversely disposed within the inner tube. The inner support could be employed to bearing the compressure, or used complementarily with other stuffing materials to achieve the bearing function. The tire as shown in FIG. 9 and Fig. could be filled in with fluid so as to facilitate the supporting function. The plastic outer cover 12 is encased with a rubber surfacing layer 111, after the inner tube is compressed, the rubber surfacing layer 111 could be engagedly affixed to the steel ring by its inherent elasticity. While after the inner tube is decompressed, the rubber surfacing layer is easily detached from the plastic outer cover. On the other hand, to obtain a desirable grounding force, the rubber surfacing layer is optional to encase the plastic outer cover, while the plastic materials could be chosen from reasonable materials.

Referring to FIG. 11, the foamed inner support 15 is received in the steel ring 203, and is coated with a rubber surfacing layer 111. The foamed inner support 15 is shaped and sized mating with the inner cavity of the wheel. That is to say, the inner support could be formed as round shape having a cross section being corresponded with the inner cavity, like round shape, rectangular shape, oval shape, or irregular shape. It is noted that the volume of the foamed inner support is less than the volumetric space of the inner cavity, so that fluid, semi-fluid stuffing materials could be filled. The circumferential length of such inner support is shorter than that of circumferential length of the cross section of the inner cavity. One side of the steel ring 203 is supplied by a clamping board 8 which is affixed to the steel ring by conventional fastening means, such as screw and bolts fasteners. So that the clamping board 8 could be attached or detached onto the steel ring 203 conveniently, thus facilitating the foamed inner support 15 and the outer cover being attached on the steel ring 203. Accordingly, the foamed inner support 15 is functioned both as an inner tube and as an inner support. Therefore, such foamed inner support 15 could be called as foamed inner tube. The foamed inner tube and the rubber surfacing layer could be adhesively coated, or tightly biased with each other by elasticity of rubber surfacing layer.

The interface is defined between the inner tube and the outer cover. And the foamed inner support could be further divided into a plurality of sub-supports, or intermixed with fluid, semi-fluid stuffing materials to be embodied as stuffing member to be received into the inner cavity. It is noted only a small amount of stuffing fluid is needed for preparing the wheel.

The present invention further provides a method for preparing such inner support. First of all, an inner support strap is prepared, such inner support strap is elongate shaped, or spirally shaped, or disc shaped, having a length twice the circumferential length of the inner support. Afterwards, a predetermined length of such strap is segmented to be winded into a concaved groove defined along the inner circumference of the steel ring. The joint portion could be adhered, or directly prepared to form a single ring-shaped inner support. The outer cover employed by conventional vehicles has a curvature shaped cross section, which is not suitable for maintaining a stable turning radius. Here, according to the present invention, the cross section of the outer cover is rectangular shaped, so that the turning radius is maintained at a stable length.

Figure 12:
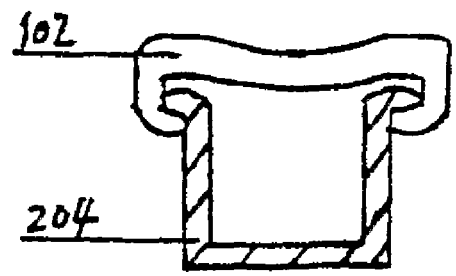
FIG. 12 is sectional view showing the concave outer cover according to the present invention.

Referring to FIG. 12, the chafer for coupling the outer cover 102 and the steel ring 204 are reversely oriented in comparison with prior art. The steel ring 204 is encased by the outer cover 102. Due to the compressed pressure applied by the stuffing fluid and the engagement structure of such chafer, the fluid is preventative from leaking out. Furthermore, the outer cover 102 is not apt to be loosened up or separated from the steel ring 204. Inside the steel ring 204, there are inner tubes or inner supports provided. The outside circumferential surface of the outer cover 102 is inwardly curved, so that after the middle portion of the outer cover is applied by a compressed force, the middle portion would be further protruded outwardly compared with the edge portion of the outer cover 102. So the concaved portion will compensate this protruding advantage of the middle portion so as to ensure the turning radius of the wheel unchanged or less shortened.

Alternatively, the middle portion of the outer cover could be thickened for achieving such compensating effects. Conclusively, such kind of chafer arrangement could efficiently ensure vehicles equipped with such wheel operable under varying circumstances, and maximally increase the landing area.

Figure 13:
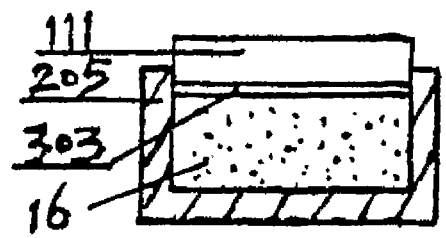
FIG. 13 is a sectional view showing tire wherein no air inlet is associated.

Referring to FIG. 13, a portion of the outer cover 111 is encased by the steel ring 205, and such outer cover 111 is made inclusively of rubber surfacing layer. The stuffing materials 16 are of powder, granular, solid materials, being formed as fluid or cream substance. Such stuffing materials could be filled in through the conventional air valve, or be pumped in through a water pump or a mud pump. The liner of the outer cover 111 could be providing with plastic membrane 303. Or otherwise, a plastic inner tube 301 is applied.

Figure 14:
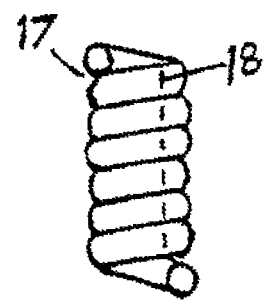
FIG. 14 is a schematic view showing plastic membrane inner tube and inner support.

Referring to FIG. 14, the semi-product of the plastic inner tube is elongate tube shaped and disposed with a spiral manner. The inner tube could be formed as an elongated tube made of plastic materials, and spirally formed having a length twice as the circumferential length of the wheel. It is noted that the cross section of such inner tube is larger than the inner circumferential length of the inner cavity. A marker 18 is set on a predetermined length of such tube, and to be segmented according to user's mind. Two ends of such segmented tube could be coupled in an end-to-end manner to form a wheel having an air valve defined thereon.

Due to the inside pressure, the coupling joint is capable of coupling with each other during applications. Accordingly, the outer cover of such wheel could be prepared as well, and the foamed inner support could be prepared by such method as well.

Figure 15:
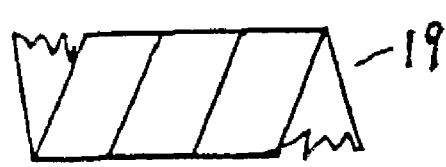
FIG. 15 is a schematic view showing membrane inner tube.
Figure 16:
FIG. 16 is a schematic view showing membrane inner tube.

Referring to FIG. 15 and FIG. 16, the plastic membrane is elongated and flattened shaped. After such elongated strap is spirally twisted, a gluing process or melting process is succeeded for forming such plastic membrane. The seaming 22 is created at the side edges after the strap is twisted. There is no air valve defined on the plastic membrane inner tube, only an air inlet is provided aligning with the air valve on the steel ring wherein the stuffing materials are filled. The transparent or colored materials could be applied to prepare such inner tube and outer cover as shown in FIG. 16.

Figure 17:
FIG. 17 is a schematic view showing membrane inner tube.
Figure 18:
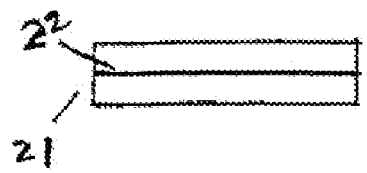
FIG. 18 is a schematic view showing membrane inner tube.

Referring to FIG. 17 and FIG. 18, two edges the plastic membrane 20 are jointing together to form a tube-shaped body having a joint seam 22. In other words, the strap shaped membrane is folded to form such membrane inner tube. There is no air valve defined on such inner tube, only an air inlet is provided aligning with the air valve on the steel ring wherein the stuffing materials are filled.

Figure 19:
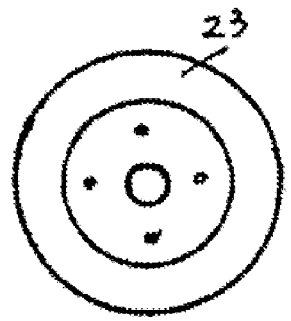
FIG. 19-FIG. 24 illustrate three kinds of clamping board structure.
Figure 20:
Figure 21:
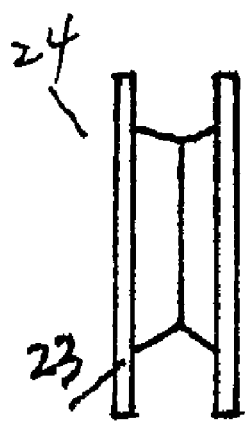

Referring to FIG. 19, the clamping board 23 is dish shaped. The middle portion of such clamping board is protruded for engaging with other objects and the peripheral portions of the clamping board is adapted for forming the inner cavity. The FIG. 20 is left view of the FIG. 19. As shown in FIG. 21, two clamping boards 23 are coupled together by screw-bolts means to form a main frame 24 of the wheel adapted for replacing steel ring and the steel basin. The inner tube and the outer cover are received in a groove defined by the pair of clamping board, wherein the axis of the round shaped clamping board could be coaxially coupled to driving shaft. After the clamping board is fastened, the inner tube and outer cover could be squeezed into the groove defined by the clamping boards so that the inner pressure of the inner tube will be correspondingly increased for bearing a loading force.

Figure 22:
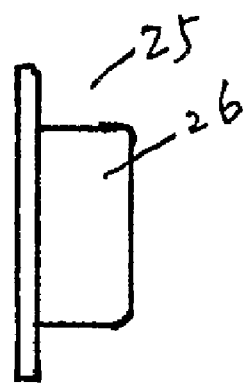

Referring to FIG. 22, the clamping board are designed to have a relatively deeper protrusion 26 integrally protruded from a middle portion of the clamping board. Such clamping board could be directly coupled with a flat clamping board to define a main frame of a wheel, thereby ultimately replacing the steel ring and steel basin.

Figure 23:
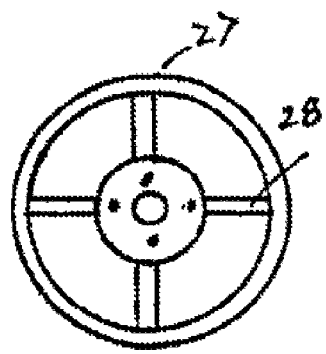
Figure 24:
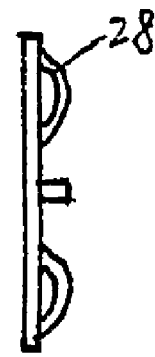

Referring to FIG. 23, the clamping board 27 is round shaped having a plurality of spokes 28 extended from the central axis. Such kind of clamping board is adapted to be installed on conventional wheel for eliminating the blowout damage. It is noted that all clamping board, steel basin, steel ring could be made of plastic materials. The FIG. 24 is a left view of FIG. 23. Finally, the clamping board could be functioned as decorating boards in routine applications.

Figure 25:
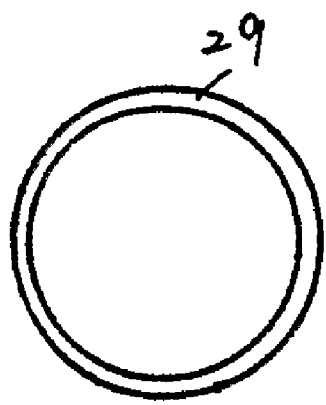
FIG. 25-FIG. 26 illustrate the structure of tension band.
Figure 26:
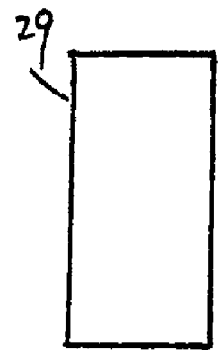

As shown in FIG. 25 and FIG. 26, the loop shaped tension strap 29 is prepared by the same method of manufacturing driving belt. The inner wall of the tension belt has membrane coating layer, for replacing the inner tube. Furthermore, the tension strap could be combined with the inner tube and the outer cover. The elasticity of the tension strap is limited to a lower value, and the tension strap is of certain softness. The cross section of the tension strap is flattened or shaped mating with the inner tube and outer cover.

Figure 27:
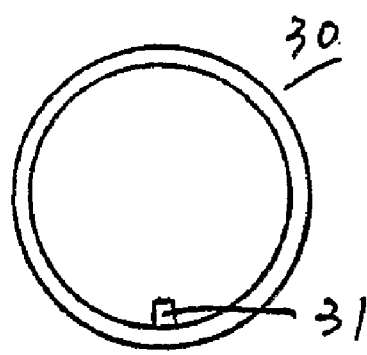
FIG. 27-FIG. 28 illustrate the plastic membrane inner tube.
Figure 28:
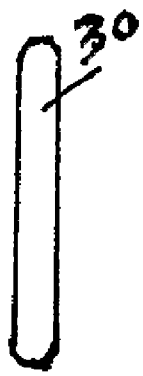

As shown in FIG. 27 and FIG. 28, the plastic membrane inner tube has an air valve 31. In case of such wheel is applied to a bicycle, the rubber hose of the air valve could be inserted into the plastic membrane inner tube. The air inlet of the plastic membrane inner tube could be positioned close to the steel ring so as to seal off the air valve for preventing the stuffing materials from being leaked.

Figure 29:
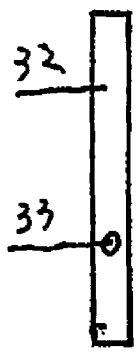
FIG. 29 is a schematic view illustrating an elongate inner tube.

As shown in FIG. 29, the inner tube is cylindrically shaped, wherein two ends of the inner tube is sealed off, an air inlet 33 is defined on the inner tube for installing the air valve. The cylindrically shaped inner tube 29 is winded into the inner cavity to be filled with stuffing materials to form a natural joint.

Figure 30:
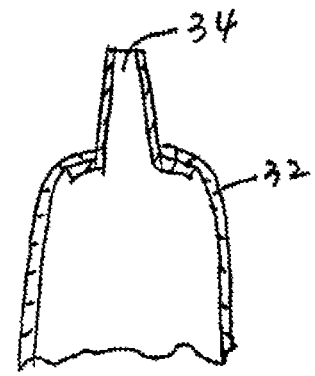
FIG. 30-FIG. 31 are schematic views illustrating membrane inner tube.

As shown in FIG. 30, the inner tube 32 comprises an air inlet which is adhesively or thematically coupled to the inner tube.

Figure 31:
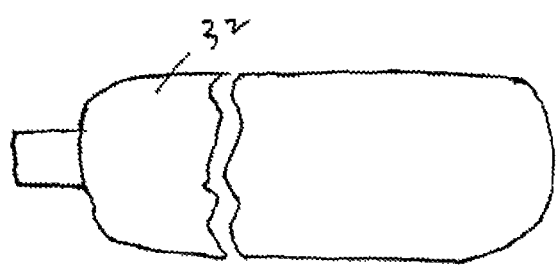
Figure 32:
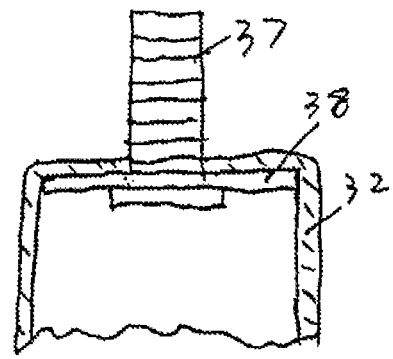
FIG. 32-FIG. 33 are schematic views illustrating the air valves of the tire.

As shown in FIG. 31, the inner tube 32 is an elongated and baggy shaped, having a free end and closing end. The inner tube could be made of plastic membrane or rubber membrane or synthetic membrane. In FIG. 32, the free end of the inner tube is coupled with air valve 37, between which is cushion 38.

Figure 33:
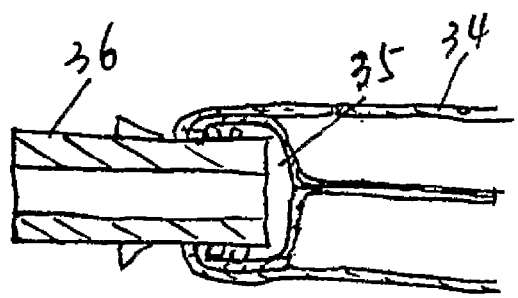

As shown in FIG. 33, there is penetrating channel defined within the air valve 36. Such kind of penetrating channel could minimize the resistance so as to facilitate the stuff filling process. The air valve 36 comprises a membrane tube 35 being of multilayer structure. During the application, the air inlet 34 is sleeved on the air valve 36 to encase the membrane tube 35. After the filling process, the pressure applied by the inner tube of the wheel will squeeze the membrane tube 35 into a flatten shape thus sealing off the penetrating channel. Meanwhile, the pressure will also force the air inlet 34 and the air valve biasing against the steel ring. Here, the membrane tube could be made of plastic membrane, rubber membrane or synthetic membrane.

Figure 34:
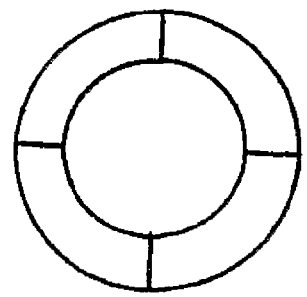
FIG. 34 is a schematic view illustrating the inner support.
Figure 35:
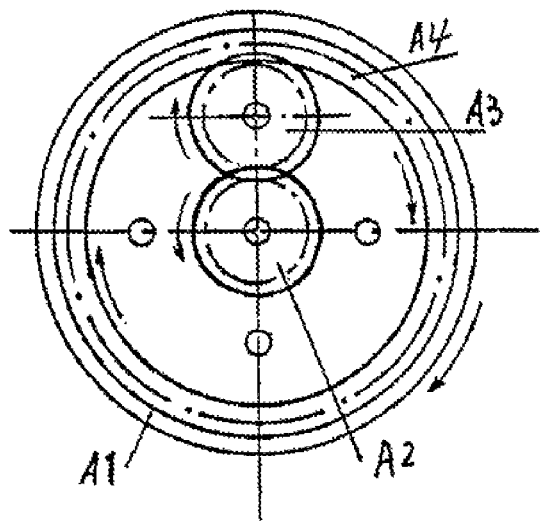
FIG. 35-FIG. 41 are schematic views illustrating the wheel rim transmission structure.

As shown in FIG. 34, the inner support comprises four individual portions for facilitating the assembling and disassembling process.

It is well known within the art that tire-repairing injection fluid could be filled into the tire for sealing off the small openings. It is noted that at least one third of the volumetric space will be filled into such injecting fluid.

However, the conventional injecting fluid only is functioned as energy saving function, not for bearing pressure as frame support. Conclusively, the present invention provides a steel-tired wheel, combining support, heat transferring, security, efficacy function together.

Figure 36:
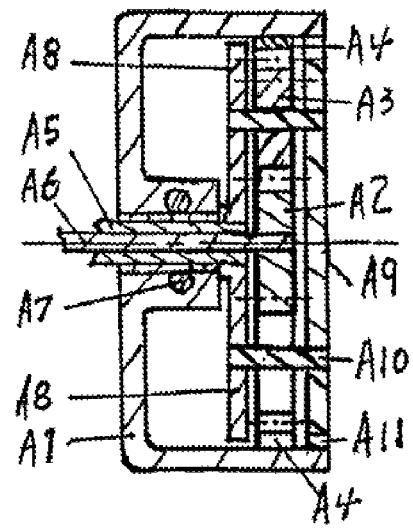
Figure 37:
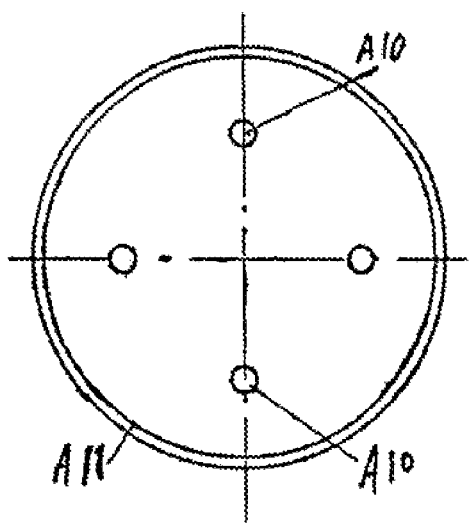
Figure 38:
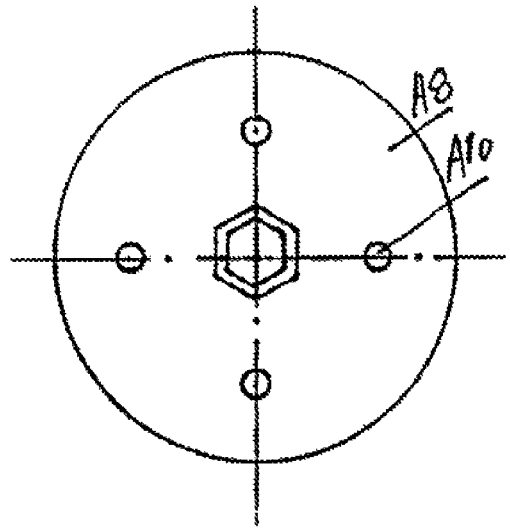

Referring to FIG. 35 to FIG. 41, the transmission apparatus and method according to the present invention are illustrated. Here, FIG. 36 is a sectional view of FIG. 35 along the vertical central line, wherein the FIG. 36 shows the baffle plate and fastening means. FIG. 37 shows the outer baffle plate and FIG. 38 shows the inner baffle plate. The steel basin A1 comprises an inside engaging ring A4 which affixed defined on the steel basin A1. According to the present invention, the inside engaging ring could be embodied as a looped ring, or as a segmented ring. The main drive gear is centered in the wheel and coaxially coupled to the transmission shaft A6, the intermediate gear is disposed between inside engaging ring A4 and the main drive gear A2 so as to transfer the dynamic force to the inside engaging ring A4 thus forcing the wheel into rotation. The wheel basin A1 is rotatable with respect to the vehicle shaft A5 which is maintained with a stable manner. It is note that a tire is attached to the steel basin A1, which is not shown in Figs. The transmission shaft A6 is penetrating through the center slot of the vehicle shaft, wherein the main drive gear A2 is affixed to one end of the transmission shaft A6. The dynamic force is originally from the engine, which could be embodied as combustion engine, air-actuated engine, and electrical motor. The inner baffle plate A8 is fixedly coupled to the vehicle shaft A5, wherein the center slot of the inside baffle plate could be rectangular shape, or polygonal shape for being fixed to the vehicle shalt. The vehicle shaft A5 further comprises a locating pin which is correspondingly mated with the locating slot defined on the shaft tube of the inner baffle plate. It is noted that other locating means, such as tongue and groove, could be used for positioning the inner baffle plate. The shaft of the intermediate gear A3 is positioned on the inner baffle plate, so as to position the intermediate gear within the steel basin A1 well above the transmission gear. Another function of the inner baffle plate is to couple the outer baffle plate through screw-blot connecting aperture A10. The transmission arrangement further comprises means for regulating and correcting the position of the inner baffle plate, such regulating means is located within the steel basin A1.

The outer baffle plate A9 is adapted to ward off the dust, dirt or any impurity so as to protect the gear assembly, and to position and decorate the transmission arrangement. The inner baffle plate A8 and outer baffle plate A9 both comprise reinforcement ribs, tucked edge and draw bead for further improving the rigidity and overall performance. Each of the inner and outer baffle plate has four screw-bolt holes A10, for receiving the screw. The outer baffle plate further comprises a sealing edge A11, which is selected from a group consisting of rubber edge, film edge or gluing edge, being soft and friction proof so as to block dirt and water into the steel basin. The transmission arrangement further comprises bearing device A7.

As the Figs illustrated, the ultimate force will be applied on the upper rim of the wheel so as to drive the wheel into rotation. The upper portion of the wheel, ranging from the inside engaging ring to the circle center, is functioned as a power arm. On the other hand, the lower portion of the wheel, ranging from the circle center to the circumferential edge, is functioned as a resisting arm. Since the power arm is shorter than the resisting arm, the power consumption could not be saved according to the leverage mechanism. Compared with the prior art which employs the shaft radius as a resisting arm, the present invention employs the wheel radius as the resisting arm to reduce the energy consumption. The intermediate gear A3 is disposed above the elevation of the main drive gear A2.

Figure 39:
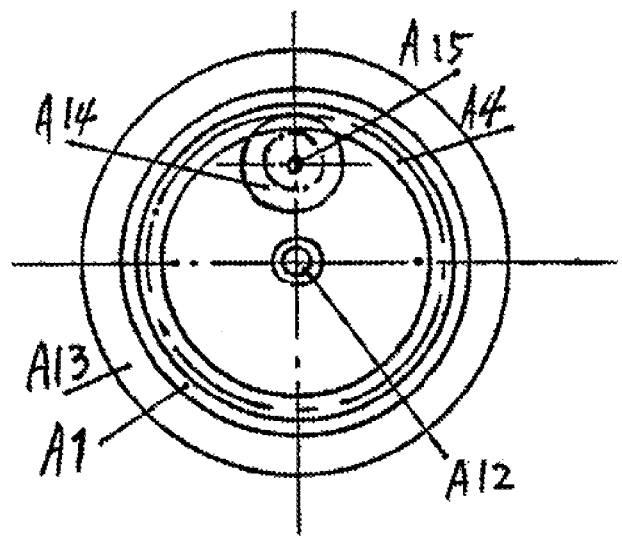
Figure 40:
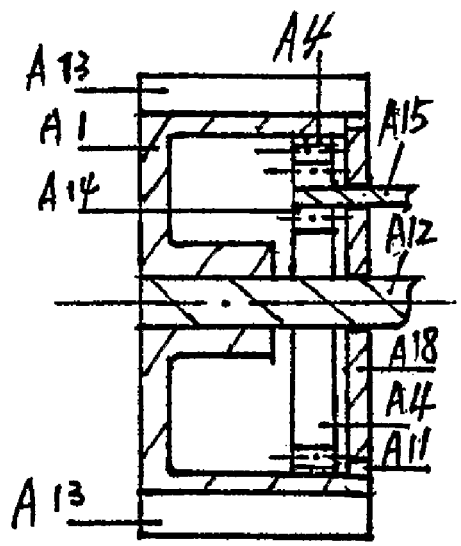
Figure 41:
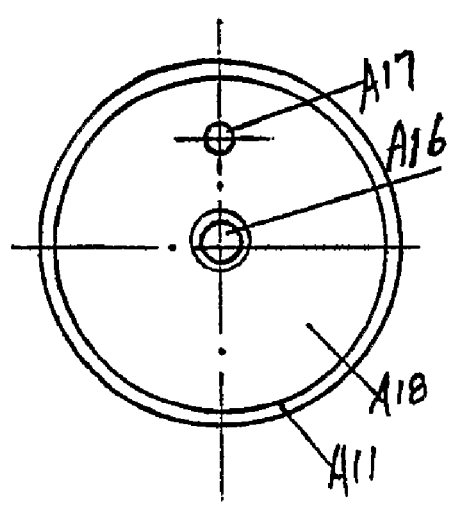

As shown in FIG. 39, the outer baffle plate is detached from the transmission arrangement, and the FIG. 40 is sectional view of the FIG. 39 along the vertical center line. The transmission gear A14 is coupled to the transmission shaft 15, which is extended into the steel basin A1 to be engaged with the inside engaging ring A4 for driving the wheel into rotation. Accordingly, the tire outer cover A13 and steel basin A1 are either embodied as a flattened tire structure as described in Chapter 1, or conventional steel-tired wheel arrangement. The steel basin A1 is capable of rotating with respect to the vehicle shall A12.

The outer baffle plate A18 has a large slot A16 and a small slot A17 defined thereon, respectively for inserting the vehicle shaft A12 and the transmission shaft A15. It is noted that the transmission shaft A15 could be the shaft of an electrical motor. The transmission gear A14 is rotatable above the wheel so as to form a wheel rim transmission device. In FIG. 39, the transmission shaft is located at the wheel rim, while in FIG. 35, the transmission shaft is positioned at the circle center of the wheel.

Figure 42:
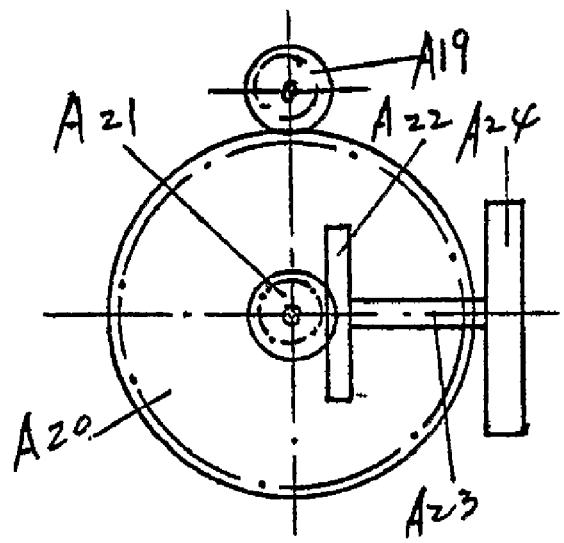

As shown in FIG. 42, the transmission gear A19 is engaged with the large gear 20, which is coaxially coupled to the small gear A21, for generating the running gear arrangement. The small gear A21 is adapted to drive the follower gear A22, which is coupled to the transmission shaft A23, being affixed to the wheel A24, so as to drive the wheel A24 into rotation. The diameter of the follower gear A22 is less than the diameter of the wheel A24 so as to maintain a predetermined height above the ground. If the condition permitted, a larger diameter of such follower gear A22 is desirable. The follower gear A23 could be positioned at a peripheral portion of the wheel, so as to drive the wheel A24 via an engaging gear arrangement. The bevel drive gear could be used for ensuring the small gear/follower gear transmission arrangement. Furthermore, the follower gear could have corresponding perforations or indents, so that the small gear could be engaged with such perforations or indents for driving the follower gear into rotation as shown in FIG. 44 to FIG. 46. In conventional prior art, the diameter of the follower gear is less than one third of the wheel. According to the present invention, the diameter of the follower gear is at least one third of the diameter of the wheel.

As shown in FIG. 43, the transmission gear A19 is engaged with the large gear A20. The large gear A20 and small gear A21 form a wheel gear arrangement. The small gear A21 is adapted to drive the intermediate gear A25, which in turn drive wheel A24 into rotation. It is noted that the large gear A20 is capable of directly driving the wheel A24 into rotation.

Referring to FIG. 44, the gear driving plate A26 is illustrated, the gear driving plate A26 is a plate shaped member installed on the wheel or follower gear for providing dynamic force. The diameter of the gear driving plate had a diameter being almost identical with the diameter of the steel basin, so that the gear driving plate could be coupled to the follower gear or wheel, for transferring the dynamic from the engine. The gearing driving plate has a plurality of engaging indents or engaging slots defined thereon for correspondingly engaging with gears to driving such gears into motion. What is more, the gear driving plate has four assembling holes for coupling to the steel basin or follower gear.

FIG. 45 is a sectional view of FIG. 44 along the center line, showing the engaging slots A27 for inserting the gear teeth so as to transferring the dynamic force. The assembling holes A28 is adapted for coupling with the follower gears. Finally, it is noted that the gear driving plate could be directly used as drive gear.

Referring to FIG. 46, the gear driving plate having engaging indents thereon, the engaging indent is defined, so that gear teeth could be engaged for driving the wheel into motion. Referring to FIG. 47, there is a gear rack A32 defined on the gear driving plate A31 for replacing the engaging slots. Referring to FIG. 48, the gearing driving plate A26 is provided to the steel basin A1 by screw-bolt means through the assembling holes A28.

Figure 49:
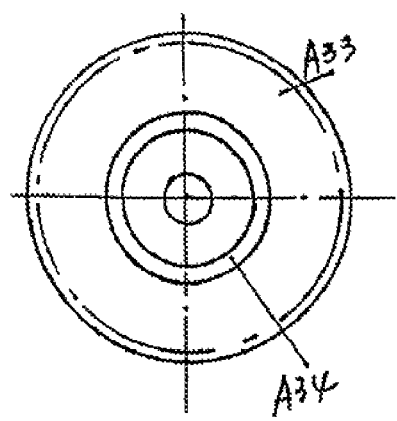
FIG. 49-FIG. 50 are schematic views illustrating rim transmission structure for railed vehicle.
Figure 50:
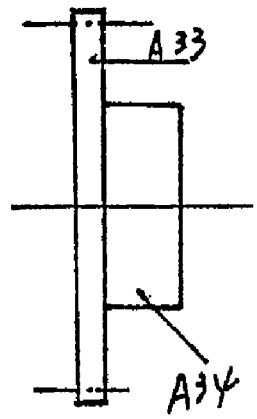

Referring to the FIG. 49 and FIG. 50, the railed vehicle transmission structure is illustrated. For instance, the train wheel A34 comprises a wheel rim A33 having engaging teeth defined thereon so as to receive the dynamic force for driving the train wheel into rotation. Here, the wheel rim 33 is purposely and disproportionably drawn with a larger size to illustrate the difference between wheel and shall. FIG. 50 is a left view of the FIG. 49, wherein the gear is represented by dashed line.

Figure 51:
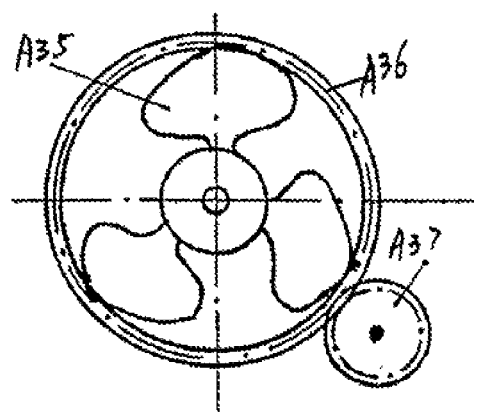
FIG. 51-FIG. 52 are schematic views illustrating wheel rim transmission structure of the blade fan.
Figure 52:
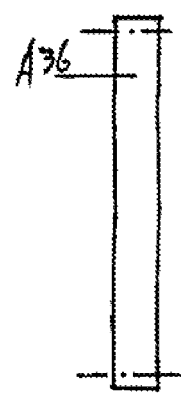

Referring to FIG. 51 and FIG. 52, a circle of engaging teeth A36 is defined along the outer edge of the fan blade A35. The drive gear A37 of the engine is engaged with the engaging teeth A36. The base of the fan and other structure are not shown in the Fig. The FIG. 52 is a left view of the engaging teeth A36, wherein the engaging teeth are represented by the dashed line. Accordingly, the propeller structure could be embodied as the same transmission arrangement.

Figure 53:
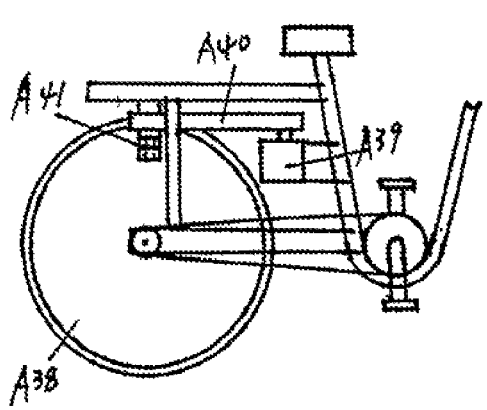

As shown in FIG. 53, the electrical motor A39 is affixed to a vehicle frame, where the dynamic force is transferred to the transmission gear via a belt A40. The transmission gear A41 is arranged at a rear bracket, and the transmission gear comprises a friction gear, which is made of rubber, plastic, metal or any combination thereof. The friction gear is tightly biasing against the outer cover of the rear wheel A38 and/or the steel ring so as to driving the rear wheel A38 into rotation via frictional force. The transmission gear is positioned adjacent to the rear wheel A38 wherein the transmission mode could be unilateral mode or bilateral mode. In case of the bilateral mode is used, the electrical engine and transmission gear are horizontally disposed, i.e. the electrical engine and transmission gear are axially oriented towards the rear wheel A38. The friction gears are provided to the two ends of the transmission gear A38 or two ends of the engine motor shaft for sandwiching the rear wheel A38 therebetween so as to drive the rear wheel A38 into rotation. Such sandwiching design further provides a righting function for righting and positioning the wheel. It is noted that the friction gear is of certain elasticity for increasing the frictional force under an accidental circumstance. Such friction gear could be made of rubber compounding materials. One or more resilient member could be provided to the friction gear for limiting the lateral movement of the friction gear with respect to the shaft.

The transmission gear is positioned above the rear wheel A38, i.e. the upward side of the landing portion, so that the wheel-axis and active pulley mechanism could be substantially utilized to save the energy consumption. After the rotational speed is increased, the speed of the wheel will be increased as well. Alternatively, the electrical motor could be disposed to the transmission gear, to directly driving the rear wheel A38. The spokes of wheel are not shown in the Figure.

Figure 54:
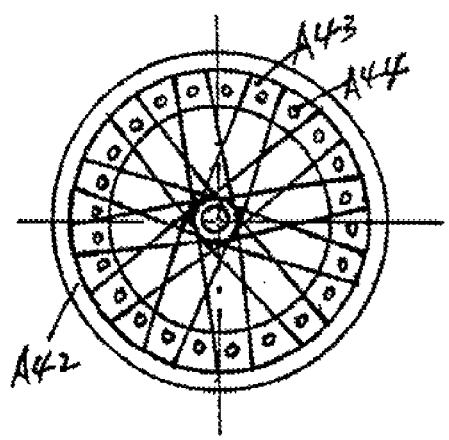

Referring to FIG. 54 to FIG. 56, the engaging plate A43 is provided to the bicycle wheel A42, the engaging plate A43 comprises a plurality of round shaped engaging slots A44 radially and spacedly defined along the peripheral portion of the wheel. The engaging plate A43 is disposed within the spokes. FIG. 55 is a partial enlarged view showing engaging plate A43 and FIG. 56 is a side view of such engaging plate A43.

As shown in FIG. 57, the engaging slots A46 of the engaging plate A45 is defined as slotted holes for facilitating the insertion and disengagement of the gear teeth. The engaging plate could be formed by a plurality of segmented and curved plate units aligned with an end to end manner, so that the assembling and repairing process could be significantly simplified. And the engaging plate could be made of rubber, plastics, metal, or any synthetic materials, and could be attached to the wheel by any conventional fastening means, such as screw-bolt, clipper, welding means, gluing means, and so on.

As shown in FIG. 58 and FIG. 59, the gear wheel A47 comprises tipped teeth A48, which is adapted to be inserted into the engaging slots. The tipped teeth and the gear wheel could be integrally formed or combined together by attaching means.

Referring to FIG. 60, the rotational entertaining wheel is illustrated. Like a fan, the entertaining wheel is electrically connected with an electrical motor for receiving a transmission force. There are two types of rim transmission mode, namely, suspended mode and positioned mode. Accordingly, the wheel of suspended mode is not supposed to be grounded, but is supported by a shaft to be rotatable with respect to the shall. To drive such kind of wheel into rotation, the stress could be applied to any peripheral portion of the wheel according to the wheel-axis mechanism. Accordingly, the positioned mode of the wheel comprises a landing portion, so that the wheel is capable of rotatably moving with respect to the ground. The dynamic force could apply to the upper portion of the wheel, or a region well above the elevated center line of the wheel.

As shown in FIG. 60, the hanging basket A50 is moveably connected with the rotational wheel A49 which is rotatably moveable with respect to a shaft, wherein an electrical motor is disposed below the rotational wheel for driving the rotational wheel into rotation. The transmission mode could be embodied as gear means, or as friction gear. The arrow indicates that the hanging basket is weight towards the ground.

As shown in FIG. 61, the slanting line area which is extending beyond the central circle A53 refers to the wheel rim area for bearing the dynamic force from the electrical motor. It is noted that the dynamic force could be applied to any point within the slanting line area; preferably, the point G is the most optimal point which is located well above the landing portion of the wheel as well as the upward direction of the center circle A53.

The force bearing point could be disposed beyond the wheel rim, for example, the wheel rim of the train wheel. The radius of the center circle A53 is one third of the diameter of the wheel A52, and is positioned above the line cd. That is to say, any point of the region beyond the center circle could be embodied as dynamic force bearing point. The line ab is the elevated center line of the wheel. The area adjacent to the elevated center line could be employed as the bearing point. As shown in the Fig, the height of $h_1$ is one third of the height $h_2$; thus indicating any area well above the one third of the height of the wheel could be used as the force bearing point to receive the driving force.

Figure 62:
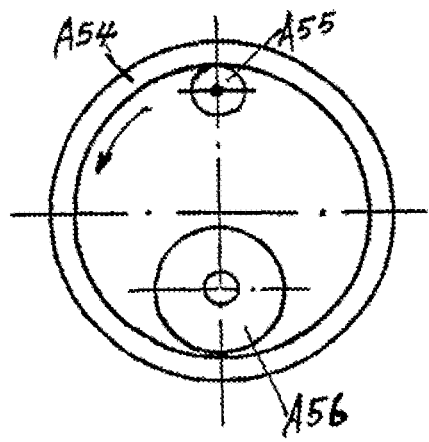
FIG. 62-FIG. 63 illustrate two types of bull wheel transmission structure.

Referring to FIG. 62, the pony wheel A56 is received within the bull wheel A54 in a positioned well above the landing portion, so that the bearing load of the vehicle will be transferred to the pony wheel, which in turn transmitted to the bull wheel. The vehicle body is connected to the center shaft of the pony wheel A56 by conventional connecting means, such as rotatable connection, or fixed connection. When the bull wheel is driven by the transmission gear A55, the pony wheel will downwardly roll within the bull wheel due to the weight and driving force of the bull wheel, so as to drive the bull wheel into rotation. Accordingly, the baffle plate specified in FIG. 37 and FIG. 38 could be coupled to the center shall of the pony wheel, so that the transmission gear A55 could be arranged between the baffle and vehicle body.

Figure 63:
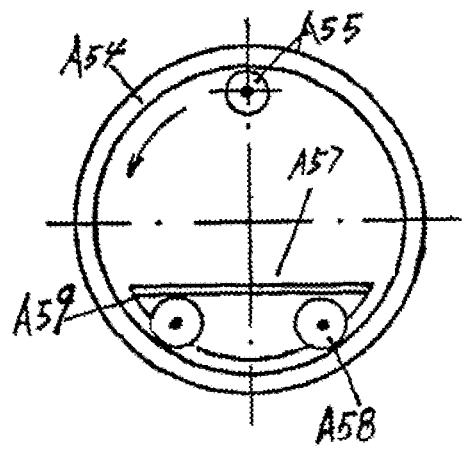

As shown in FIG. 63, a trolley A57 is provided within the bull wheel A54 for replacing the pony wheel, wherein the trolley A57 comprises a trolley frame A59 and a plurality of trolley wheels A58. The vehicle body is connected to the trolley A57 with convention connecting mode, such as rotatable connection, or fixed connection. The weight of the vehicle body is withstand by the trolley A57, which is rotatably movable within the bull wheel A54. The trolley looks like a sliding trolley or skating roller having a support plate, and two shaft disposed at two ends of the support plate for equipping with a pair of wheels. Or otherwise, the trolley is embodied as round shaped bearings having a plurality of rolling wheel defined on the round peripheral portion.

Accordingly, the conventional positioning means, such as positioning groove, projected ridge, and upward stopper could be defined on the trolley wheels to ensure the trolley disposed at a fixed position with the bull wheel. Furthermore, the trolley wheel comprises chafers for moveably and longitudinally engaging with the bull wheel.

What is more, the trolley could be replaced by the sliding block, which is slidely moveable with respect to the bull wheel. The lubricating means could be used for facilitating the sliding movement. It is noted that the volume of the trolley frame could be increased to extend the circle center of the bull wheel, so that the electrical motor and transmission gear could be installed thereon. However, only the trolley wheels are fixed to the bull wheel, while the trolley frame is not fixed to the bull wheel A54 for affecting the movement of the bull wheel A54.

Meanwhile, the trolley frame could be functioned to position the bull wheel wherein the trolley frame comprises grooves which is shaped and sized mating the projected tongue defined on the bull wheel A54, so that by inserting the projected tongue into the grooves, the bull wheel A54 is capable of being positioned by the trolley frame. Under a normal circumstance, the project tongue and the groove are not engaged, wherein a clearance is defined therebetween, however, under an abnormal circumstance, the groove will block the projected tongue from going further so as to longitudinally or axially position the bull wheel.

There is a plurality of transmission mode applied to the bull wheel. For instance, one vehicle could comprise only one bull wheel, that is to say, only one of the wheels of the vehicle is driven by the bull wheel. Or otherwise, the vehicle comprises a plurality of bull wheel functioning together to drive the vehicle into movement. In case of more than two bull wheels are utilized, the bull wheels could be coaxially arranged or disposed on separated shaft. For instance, common bicycles and cars have a front and a rear shaft.

It is noted that two bull wheels could be axially aligned with a same orientation. The bull wheel comprises a follower gear being affixed to the bull wheel at opposed side or a single side so as to replace the bull wheel for receiving a transmission force. Alternatively, the follower gear is coupled to the axial shall of the bull wheel, not being grounded for only bearing the dynamic force.

The diameter of the follower gear is less than the diameter of the bull wheel so that the follower gear could be easily detached from the bull wheel. Alternatively, the follower gear is fixedly coupled to one side of the bull wheel, wherein the diameter is identical or close to the diameter of the bull wheel. In the wheeled chair for those disabled people, the follower gear is functioned as the hand actuating wheel for driving the bull wheel into rotation, wherein the trolley is disposed within the bull wheel and the seat is attached onto the trolley.

Figure 64:
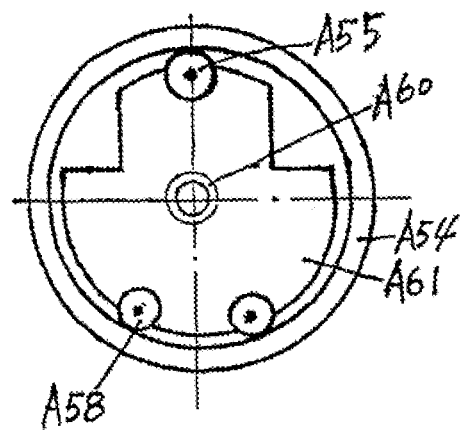
FIG. 64 illustrates the bull wheel transmission structure wherein the bull wheel and the pony wheel are coaxially coupled.

Referring to FIG. 63 and FIG. 64, the vehicle shall A5, intermediate gear A3 are coupled to the trolley A57 or A61, so as to form a vehicle wheel driven by the bull wheel. It is noted that bull wheel transmission, rim transmission could be combined to form a more efficient transmission arrangement. For common bus, only two such transmitted wheel are required to achieve a more efficient transmission effect. If a trailer is dragged by the vehicles, the trailer could be directly connected to the trolley. Here, the vehicle body refers to the main body of the vehicle on which the wheels are provided. The vehicle body comprises a vehicle frame and a carriage mounted on the vehicle frame. The engine could be mounted to the vehicle frame for driving the vehicle into movement. Here, the transmission gear A55 is of certain elasticity and arranged to be movable in a vertical manner to match the movement of the vehicle.

As shown in FIG. 64, the structure of trolley A61 is different with the structure of the trolley A57, wherein the height of the trolley A61 is well above the circle center to a position close to the roof the circle, so as to provide a base for the transmission gear A55. Here, the trolley is round shaped for facilitating the positioning procedure of the bull wheel. The driving force from the transmission gear could be applied to rim area of the bull wheel. Preferably, the desirable bearing point is defined on the upper portion of the bull wheel, i.e. the upward side or the vertical center line of the circle. As shown in FIG. 64, the transmission gear is positioned at such area.

As shown in FIG. 30, the pony wheel and the bull wheel share one circle center A60 wherein the shaft A61 is disposed. As a result, the shaft of the trolley could position the bull wheel A54. The center slot of the bull wheel is larger than the diameter of the pony wheel, or otherwise, the center slot could be embodied as slotted hole or oval shaped hole.

Figure 65:
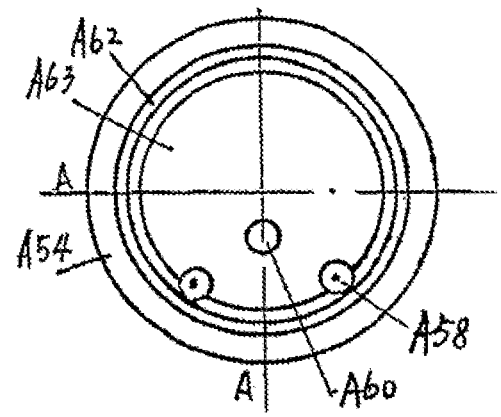
FIG. 65-FIG. 66 illustrate engaging ring are defined on two sides of the bull wheel.
Figure 66:
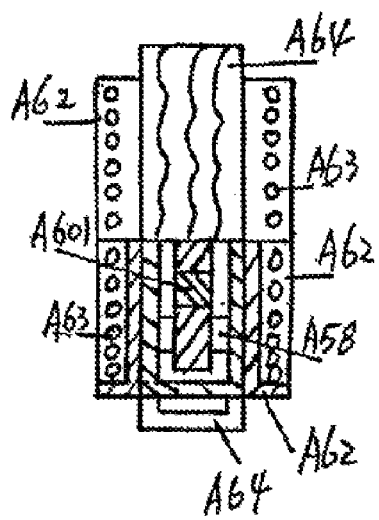
Figure 68:
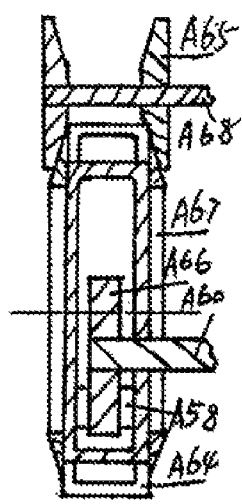

As shown in FIG. 65 and FIG. 66, gear engaging ring A62 is provided to two sides of the bull wheel A54, wherein the gear engaging ring comprises teethed slot A63 for being engaged with the gear A47, the gear A47 is positioned above the upper portion of the bull wheel. Here, the upper portion refers to not only upper side of the bull wheel, but also refers to upward region beyond the bull wheel. There is a pair of gears A47 disposed on two sides of the bull wheel as shown in FIG. 68, the pair of gears A47 are adapted to driving the bull wheel. Accordingly, the teeth-engaging slot transmission structure could be replaced by gear teeth-gear teeth transmission structure well known within the art.

Accordingly, the gear structure of the present invention includes a variety of gear structure, such as straight gear, slanted gear, and columned gear. Here, the trolley A63 is round shaped and removably coupled with the bull wheel for positioning the bull wheel as mentioned above. The shaft of the trolley could be positioned along the vertical center line. As shown in FIG. 65, the trolley shaft is disposed below the circle center or above the circle center. The FIG. 66 is a left view of the FIG. 65 along the A-A line, wherein the gear engaging ring A62 is provided to two sides of the bull gear, the bull wheel is attached with an outer cover being well projected above the gear engaging ring A62.

Figure 67:
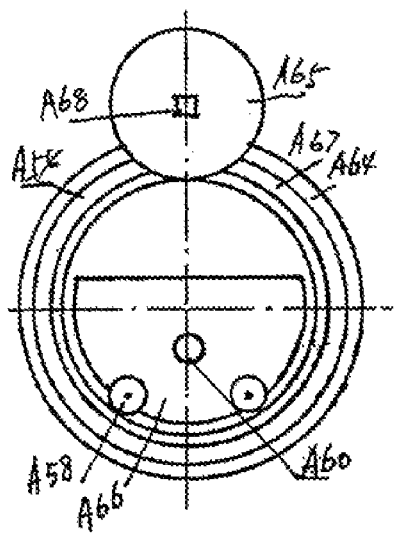
FIG. 67-FIG. 68 are schematic views showing the transmission structure provided to the upper portion of the bull wheel.

Referring to FIG. 67 and FIG. 68, the transmission gear A65 is provided to the upper portion of the bull wheel A54. Here, the transmission gear could be embodied as friction gear, which is frictionally engaged with the bearing ring A67. The transmission gear A65 and the bearing ring A67 are made of materials selected from a group consisting of metal, plastic, rubber and any compound materials. For instance, the rubber could be provided for encasing the metal to form a transmission gear. The gears could be embodied as angular gear or column gear. The transmission gear A67 comprises a rectangular shaft A68, and the transmission gear A67 is capable of slidably movable along the rectangular shaft A68 so as to generate a varying retaining force thus driving the bull wheel into rotation.

The transmission gear sliding on the rectangular shaft could be adjusted by resilient member. If the resilient member is positioned biasing against the transmission gear, a manual adjustment could be applied. By uplifting or dropping the transmission shaft, wherein the retaining force will be reduced while the transmission shaft is uplifted and the retaining force will be increased while the transmission shaft is dropped. It is noted that the transmission gear is movably coupled to the base. The manual adjustment and the automatic adjustment could be combined together to achieve a desirable function.

Figure 69:
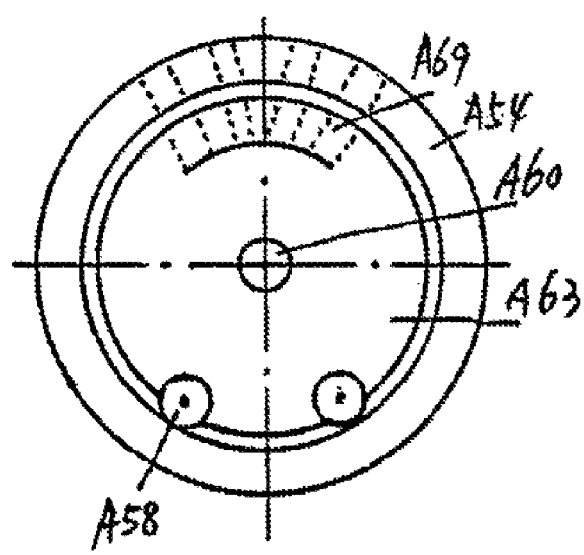
FIG. 69 is a schematic view illustrating the structure of a wheel motor.

Referring to FIG. 69, wheel motor refers to the wheel electrical motor for driving the wheel; that is to say, the wheel and the electrical motor are combined together. Here, the bull wheel is embodied as a rotor, while the pony wheel is functioned as a stator. The trolley is affixed to the vehicle body, wherein a magnetized region A69 is defined on the top side of the trolley A63. Here, the magnetized region refers to the area being capable of generating magnetized force. The magnetized region is represented by the dashed lines. It is noted that the magnetized force are maintained within the magnetized region, so that when a portion of the bull wheel is rolling into such magnetized region, the bull wheel will be electrically charged to generate magnetic force, being mutually affected with the magnetic of trolley, as a result, the bull wheel will circularly move with respect to the trolley. Accordingly, after such magnetic portion leave the magnetic region, the magnetic force will be disappear, next portion of the bull wheel will be magnetized to generate such force in a cyclic manner thus forcing the wheel into rotation. Such structure is well known within the art, such as the electrical motor and magnetic suspension trains are driven by this mechanism.

For the motor operation mechanism, the bull wheel A54 is functioned as a rotor, namely, outer rotor, and the pony gear A63 is functioned as stator, namely, inner stator. The bull wheel and pony wheel are prepared according to the rotor-stator structure. The shaft A60 is electrically charged by an electric brush. Only within the magnetic region, the rotor will be electrically charged to generate magnetic force. There is winding coil provided to the stator within the magnetic region. Certainly, the bull wheel and the pony wheel could be prepared according to the rotor manufacturing procedure, wherein the bull wheel is embodied as a rotor and the pony wheel is embodied as a stator. The magnetic force is generated along the circumferential portion of the bull wheel and pony wheel, for driving the bull wheel into rotation.

The magnetized bull wheel design eliminates the mechanic structure and enables the transmission system environment friendly, and more importantly, isolates the transmission system with outside. As shown in FIG. 68, the stator is positioned at the upper portion of the bull wheel, and curvedly shaped to match with the bull wheel so as to form a magnetized region.

Figure 70:
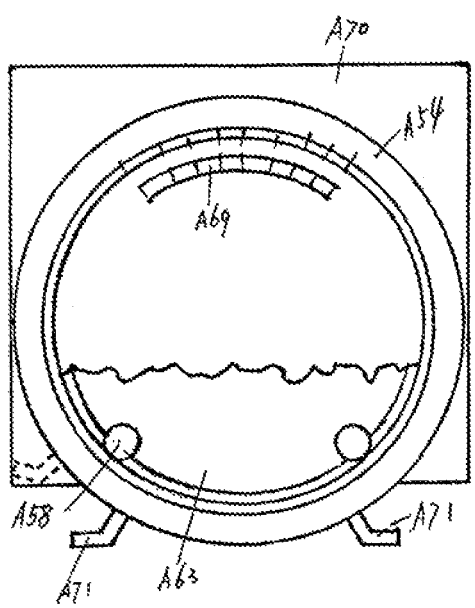
FIG. 70-FIG. 71 illustrate the bull wheel vehicle.
Figure 71:
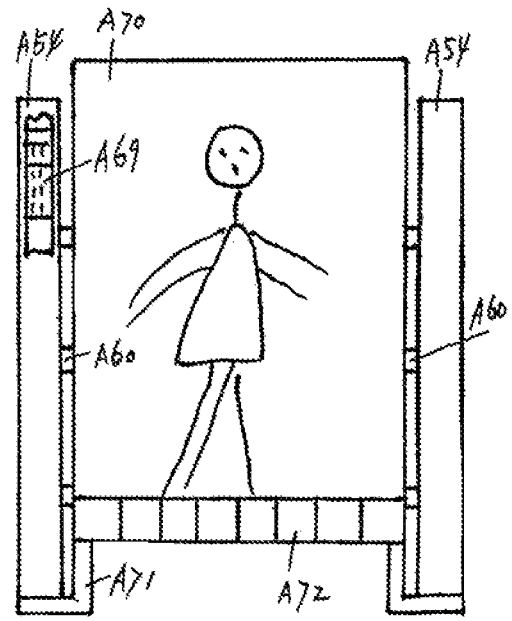

Referring to FIG. 70 and FIG. 71, the rotational bull wheel and the wheel motor forms a single wheeled vehicle, wherein the trolley A63 is affixed to the vehicle body A70, and is disposed within the bull wheel A54 by landing the trolley wheels A58 on the bull wheel. The trolley comprises a magnetic region defined on an upper portion. The vehicle body comprises an anchor plate A71, which is capable of moving in a vertical manner. A primary function of such anchor plate is to position the vehicle during a parking condition, and to brake the vehicle body from being movable. The shaft A60 is electrically charged by an electrical brush and is adapted to space the bull wheel. The storage battery is disposed at a lower portion of the vehicle body for charging the magnetic region.

As shown in FIG. 71, the magnetic region of the bull wheel is illustrated. Two bull wheels are disposed in a parallel manner, respectively receiving a trolley therein. The magnetic region is provided to both bull wheels, wherein the brake system could be installed into either bull wheel. It is noted that the bull wheel could be stopped by a reverse electrical current, and for an emergency brake, an abrupt turning could be embodied for stopping the vehicle.

Figure 72:
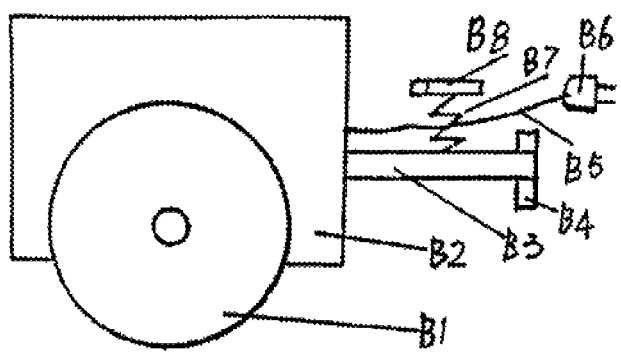
FIG. 72 is a schematic view showing an energy supplying vehicle as well as a coupling means.

Referring to FIG. 72, the energy exchanging vehicle is illustrated, the vehicle comprises a wheel assembly B1, a power source B2 mounted to the wheel assembly B1, an attaching coupler 83 which is extended from the power source, the coupler B3 comprises an protruding arm, a spring B7, and a sliding plate B8, the vehicle further comprises an electricity power outputting means having an extended outputting wire and a plug disposed in front of the vehicle body. What is more, there is a signal wire and a control wire provided to the energy exchanging vehicle.

It is noted that the electrical motor could be installed to the vehicle body too. The spring B7 and the sliding plate B8 is disposed under the energy-consuming vehicle, wherein the sliding B8 is directly contacting with the energy-consuming vehicle so as to transferably load a fraction of the weight of the energy-consuming vehicle to the attaching coupler B3, which in turn transfers the weight load to the wheel assembly B1. Here, the electrical power outputting wire is adapted not only for outputting electrical energy, but also for carrying a plurality of signal lines so as to indicate information of the electrical power source vehicle to the energy-consuming vehicle. Whenever the information indicated the energy power of the energy exchanging vehicle is shorted or insufficient, the user of the energy-consuming vehicle could find another energy exchanging power source vehicle or energy exchanging station to charge the vehicle.

Due to the fact that the coupler and electricity outputting means are conveniently detachable, the charging process could be simplified. What is more, the energy exchanging vehicle could be embodied as a trailer dragged by a bicycle, or installed to a vessel to form a power source ship for supplying energy to vessels. Conclusively, the energy exchanging vehicle must be electrically connected with an energy-consuming vehicle for charging the energy-consuming vehicle. It is noted that the energy exchanging vehicle could be used for loading passenger and cargos, and the electrical motor could be installed to such electrical power source vehicle.

Figure 73:
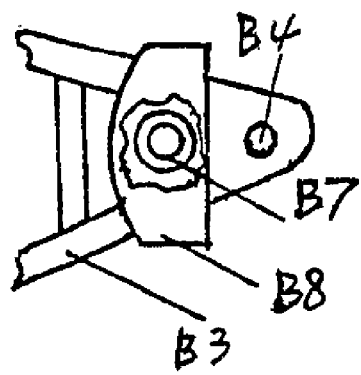

FIG. 73 is a top view of FIG. 72 showing the attaching coupler B3. It is seen that the sliding plate B8 is supported by the spring B7. As shown in FIG. 74, the protruding arm which is disposed at one end of the attaching coupler B3 is adapted to be inserted into corresponding grooves or slots so as to couple the energy exchanging vehicle to the energy-consuming vehicle.

FIG. 76 to FIG. 78 shows an alternative mode of the coupling rod B9 having an arrowed engaging end adapted to be inserted into corresponding engaging groove and slots defined on the energy-consuming body so as to coupling the energy exchanging vehicle to the energy-consuming body. It is noted such coupling rod could be used for connecting the power source to the mobile phone.

As shown in FIG. 80, the battery assembly comprises a casing B12, and twelve battery unit B13 being electrically interconnected with each other, an electrical plug extended from one side of the battery assembly. Here, it is noted that the plug could be disposed at any optimal position at the battery assembly. FIG. 81 is a right view of the FIG. 80, showing the electrical plug B14 is flattened shape. Alternatively, the electrical plug could be provided at the energy-consuming body, such as a vehicle, and accordingly, the electrical socket is provided at the power source vehicle.

To strengthen the intensity of the plug-socket structure, the plug could be prolonged and intensified so as to prevent any unwanted damage and loose connection. Furthermore, the energy power source could be divided into a plurality of types and standard for different applications, such as sedan standard, truck standard, bicycle standard, and universal standard. As a result, the battery of different brand could be interchangeably used so as to provide convenience to users.

Conclusively, the conventional coupling arrangement, plug-socket structure could be used in the present invention. There is no prior art disclosing any dry battery being used for supplying energy power to transportation means. According to the present invention, the energy-consuming vehicle could be driven by a dry battery, after the dry battery is energy shorted or depleted, the user could exchange such shorted dry battery at a predetermined energy exchanging stations to get a brand new dry battery. As a result, the depleted dry battery could be collectively reclaimed and treated with an industrial scale. And more importantly, the dry battery could be accessible to the user everywhere.

Furthermore, the energy supplying method according to the present invention could be applied to electrical appliance, illumination equipment, entertainment facilities.

Figure 83:
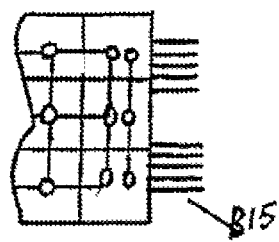

As shown in FIG. 82 and FIG. 83, a cluster joint plug B15 is provided for preventing loose contact in applications. In case of one of plug is loosen up or dead, the other plug is still effective so as to ensure the energy-consuming body being charged.

Figure 84:
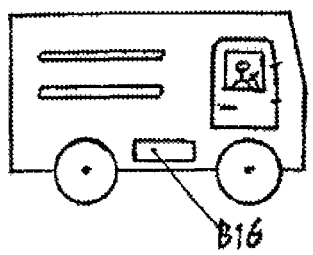
FIG. 84 is a schematic view showing a cased truck having power source receiving cavity defined thereon.

As shown in FIG. 84, the energy consuming vehicle is a kind of cased truck, wherein a square shaped power source cavity B16 is provided at a lower portion of the cased truck for receiving a power source. A pair of matched engaging or coupling structures respectively arranged at the power source and the power source cavity for securely and detachably mounting the power source therein. Or otherwise, electrical outputting wire could be lead into the driver room for operating the energy power.

Alternatively, the energy consuming vehicle comprise a plurality of power source cavities, one of which is functioned as a storage cavity, so that when such energy consumption vehicle is stopped to be recharged, the battery removing and mounting procedure could be processed simultaneously. What is more, the energy consumption vehicle could be designed to have an automatic load/unload device for detach and attach such power source to the vehicle. For instance, a plurality of storage battery is stacked to form a battery unit, which is affixed to the bottom of the vehicle by an elastic hook. During the exchange procedure, the user could press a control button to open the elastic hook to release the depleted battery. Meanwhile, the fully charged batteries are supplied to the storage cavity, to be fastened by the resilient hook.

Here, it is noted that the resilient hook could be embodied as a sliding plate, or could be operated by electrical means, mechanic means, hydraulic means and air actuating means. The power source is tightly associated with relative means, so that the power source could be conveniently unloaded from the vehicle body.

Figure 85:
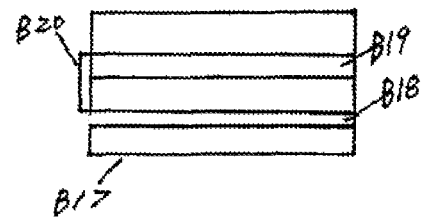
FIG. 85-FIG. 88 are schematic views showing the power source according to the present invention.

As shown in FIG. 85, the power source B17 has an attaching groove B18, an electrical groove B19, and a handle B20. In the present invention, the power source B17 is embodied as a drawer style power source to be inserted a receiving cavity defined in the vehicle body. The attaching groove B18 is elongated sliding groove provided to both sides of the power source B18 for securely positioning the power source within the receiving cavity of the vehicle body.

Here, the electrical groove B19 is another type of electrical coupling means wherein the whole elongated groove is embodied as an electrical outputting terminals, so one side of such electrical groove is applied as an anode, the opposed electrical groove is applied as a cathode. As a result, the electrical power source could be electrically connected through the electrical groove B19. The electrical receiving structure of the vehicle body could be embodied as a resilient member, being contacted with the electrical groove B19 in face to face manner.

Figure 86:
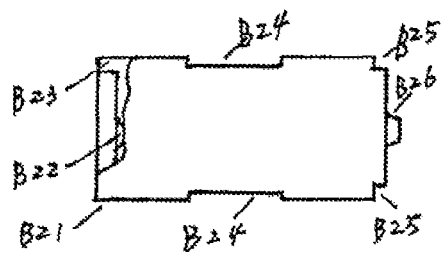
Figure 87:
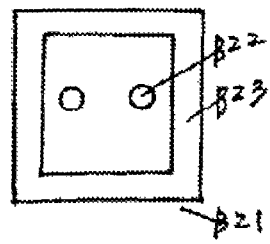

As shown in FIG. 86 and FIG. 87, the power source B21 comprises an indented end B22, an end edge B23, an opposed protruded end B26, an engaging shoulder B25. When a plurality of such power source is aligned to be connected in an end to end manner, the protruded end B26 will be inserted into the indented end B22 of the adjoining power source until the engaging shoulder B25 is biased against the end edge B23 so as to ensure adjoining power sources being aligned.

Figure 88:
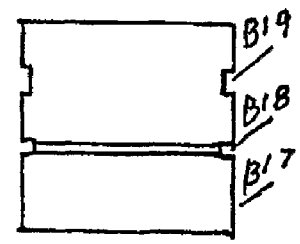

FIG. 88 is a right view of the FIG. 85 showing both of the electrical groove B19 and attaching groove B18 are symmetrically provided to oppose sides of the power source.

Figure 89:
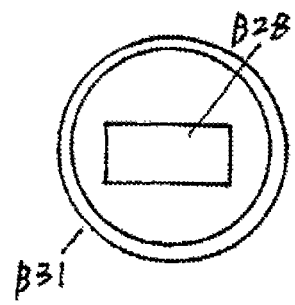
FIG. 89-FIG. 90 are schematic views illustrating the outer casing structure of the replaceable power source according to the present invention.
Figure 90:
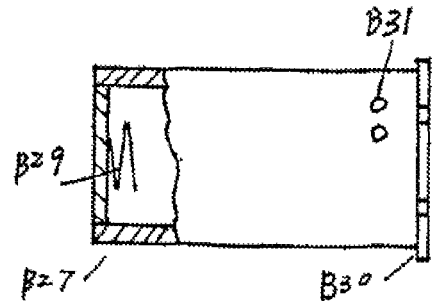

As shown in FIG. 89 and FIG. 90, the outer casing B27 of the power source is barrel shaped having a round top cover B31 disposed at one end of the outer casing, wherein the an elongate steel resilient plate B28 is defined on the top cover B31 and a coil spring B29 is received at the bottom of the barrel shaped casing B27, so that the power source could be securely positioned between the coil spring B29 and the resilient steel plate B28. The electrical linking slot B31 are provided at the barrel body for leading out the electrical wires. It is noted that the outer casing B27 is of good leak-proofness and air-tightness. Accordingly, the out casing could be shaped and sired dependent on detailed requirement to be used for containing fuel gas, fuel oil and compressed air. Finally, the toper cover could be attached to the outer casing by a clipping or a snapping fastener.

In short, the electrical vehicle comprises at least two power source chamber disposed at a lower portion of the electrical vehicle. During an energy exchanging process, the depleted power source could be unloaded from the chamber, and a fully charged power source could be loaded through another chamber. As a result, there is always a power source chamber being empty. Or otherwise, whenever a power source is energy shorted, an unload arrangement will automatically nudge such depleted power source into a releasing port so as to empty a space to load a fully charged power source.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure form such principles. Therefore, this invention includes all modifications encompassed within the spirit and scope of the following claims.

What is claimed is:

1. A method for supplying dynamic force energy to an energy consuming body, wherein the energy consuming body comprises at least one replaceable energy container, the replaceable energy container is capable of storing dynamic force energy therein, and the dynamic force energy is used in driving the energy consuming body to work, the method for supplying dynamic force energy to the energy consuming body, comprising:
providing a plurality of energy exchanging stations which are positioned along a route that is traveled on by the energy consuming body, wherein each of the energy exchanging stations holds a plurality of full replaceable energy containers, each of the full replaceable energy containers in any one of the energy exchanging stations being fully filled with dynamic force energy; and
when the dynamic force energy of the at least one replaceable energy container of the energy consuming body is depleted to thereby become a depleted replaceable energy container of the energy consuming body, and the energy consuming body is at one of the energy exchanging stations, the depleted replaceable energy container of the energy consuming body is replaced with one of the full replaceable energy containers in the energy exchanging station so that the energy consuming body can be driven to work by the dynamic force energy in the full replaceable energy container used to replace the depleted replaceable energy container.

2. The method for supplying dynamic force energy to the energy consuming body, as recited in claim 1, wherein the energy consuming body is a vehicle or a vessel, and the dynamic force energy is electric energy, gas, hydrogen or fuel oil, and the dynamic force energy is used in driving the vehicle or the vessel to travel,
wherein the electric energy is energy from a storage battery, a dry battery or a fuel cell battery, and the hydrogen is hydrogen gas or liquid hydrogen.

3. The method for supplying dynamic force energy to the energy consuming body, as recited in claim 2, wherein the at least one replaceable energy container of the energy consuming body is provided in the form of a trailer following behind the vehicle and supplying the dynamic force energy to the vehicle, or
the at least one replaceable energy container of the energy consuming body comprises is provided in the form of a boat following behind the vessel and supplying the dynamic force energy to the vessel.

4. The method for supplying dynamic force energy to the energy consuming body, as recited in claim 3, wherein the trailer comprises:
a wheel assembly;
a power source mounted to the wheel assembly and electrically connected to the energy consuming body; and
an attaching coupler extended from the power source and connected to the energy consuming body.

5. The method for supplying dynamic force energy to the energy consuming body, as recited in claim 2, wherein the at least one replaceable energy container of the energy consuming body is a storage battery, a hydrogen storage container, a gas tank, or a fuel tank.

6. The method for supplying dynamic force energy to the energy consuming body, as recited in claim 2, wherein each of the at least one replaceable energy container of the energy consuming body and the full replaceable energy containers in any one of the energy exchanging stations is provided following a universal standard.

7. The method for supplying dynamic force energy to the energy consuming body, as recited in claim 2, wherein the energy consuming body comprises two power source cavities, wherein only one of the power source cavities receives the at least one replaceable energy container of the energy consuming body therein, and the other one of the power source cavities is empty,
when the depleted replaceable energy container of the energy consuming body is replaced with the one of the full replaceable energy containers in the energy exchanging station, the depleted energy container of the energy consuming body is unloaded from the one of the power source cavities, and at approximately the same time, the one of the full replaceable energy containers in the energy exchanging station is loaded into the other one of the power source cavities from the energy exchanging station.

8. The method for supplying dynamic force energy to the energy consuming body, as recited in claim 2, wherein the energy exchanging station used to replace the depleted replaceable energy container of the energy consuming body comprises a wheel style vehicle or a gantry crane to remove the depleted replaceable energy container from the energy consuming body, and at approximately the same time, to place the full replaceable energy container on the energy consuming body.

9. The method for supplying dynamic force energy to the energy consuming body, as recited in claim 1, wherein the energy consuming body is a mobile communication equipment, and the dynamic force energy is electric energy,
wherein the electric energy is energy from a storage battery or a dry battery.

10. An energy consuming body, comprising:
an electric vehicle; and
a trailer comprising:
a wheel assembly;
a power source mounted to the wheel assembly and electrically connected to the electric vehicle; and
an attaching coupler extended from the power source and connected to the electric vehicle,
wherein the attaching coupler comprises:
a protruding arm extended from the power source;
a sliding plate disposed under the electric vehicle and directly contacting the electric vehicle; and
a spring disposed between the protruding arm and the sliding plate, and supporting the sliding plate.

11. An energy consuming body, comprising:
an electric vehicle;
a first power source electrically connected to the electric vehicle; and
a first power source cavity installed at a lower portion of the electric vehicle for receiving the first power source,
wherein a pair of matched engaging or coupling structures are respectively arranged at the first power source and the first power source cavity for securely and detachably holding the power source therein,
wherein the electric vehicle comprises:
an automatic load/unload device for detaching and attaching the first power source from the first power source cavity,
wherein the automatic load/unload device is an elastic hook, the elastic hook is operated to release or fasten the first power source,
wherein the resilient hook is operated by electrical means, mechanic means, hydraulic means or air actuating means.

* * * * *